(12) United States Patent
Giannakopoulos

(10) Patent No.: US 6,682,017 B1
(45) Date of Patent: Jan. 27, 2004

(54) AIRCRAFT WITH A DETACHABLE PASSENGER ESCAPE CABIN AND AN AIRCRAFT WITH AIRBAGS

(76) Inventor: Pavlos Giannakopoulos, P.O. Box 3075, Patra (GR)

( * ) Notice: Subject to any disclaimer, the term of this patent is extended or adjusted under 35 U.S.C. 154(b) by 0 days.

(21) Appl. No.: 10/220,977

(22) Filed: Sep. 9, 2002

(51) Int. Cl.⁷ .................................................. B64C 1/32
(52) U.S. Cl. ............... 244/140; 244/138 R; 70/DIG. 6; 70/275
(58) Field of Search ..................... 244/139, 138 R, 244/140, 100 A, 142; 292/164, 145, 150, DIG. 65; 70/DIG. 6, 10, 275

(56) References Cited

U.S. PATENT DOCUMENTS

| | | | |
|---|---|---|---|
| 4,143,841 A | * | 3/1979 | Roeder |
| 4,183,565 A | * | 1/1980 | Allemann |
| 4,306,693 A | * | 12/1981 | Cooper |
| 4,699,336 A | * | 10/1987 | Diamond |
| 5,356,097 A | * | 10/1994 | Chalupa |
| 5,568,903 A | * | 10/1996 | Pena et al. |
| 5,810,293 A | * | 9/1998 | Leeki-Woo |

FOREIGN PATENT DOCUMENTS

FR            1051874    *   9/1953  ................. 244/140

* cited by examiner

Primary Examiner—Tien Dinh

(57) ABSTRACT

An aircraft with a detachable cabin (1) that serves to rescue its passengers as a result of the aircraft's sudden fall either due to its malfunction or fire. The cabin escapes either smoothly or by means of fast ejection and descends slowly to the Earth with the aid of a parachute (13, 14); during a crash on the ground or in the sea external airbags (38a–38f) with which it is equipped and which are located in its lower part are inflated thus absorbing the loads that are developed during the crash. In addition a conventional aircraft (70) of the type being already in use is also described and in which the parachute equipment (71) has already been applied; however, the proposed equipment of the airbag boxes (72a–72c) is adapted to it for the absorption of the energy produced due to its crash on Earth in case of its sudden fall.

8 Claims, 18 Drawing Sheets

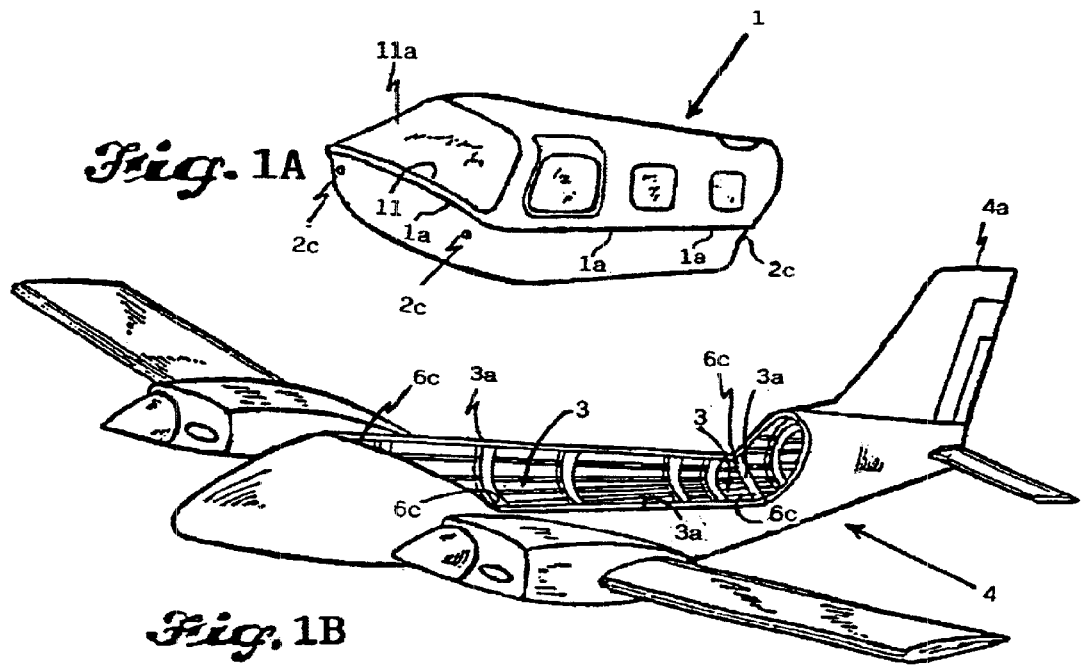
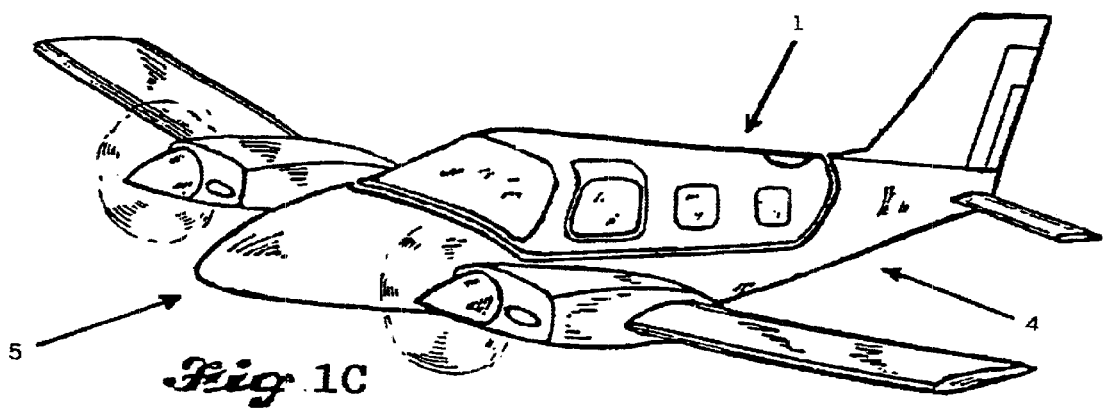

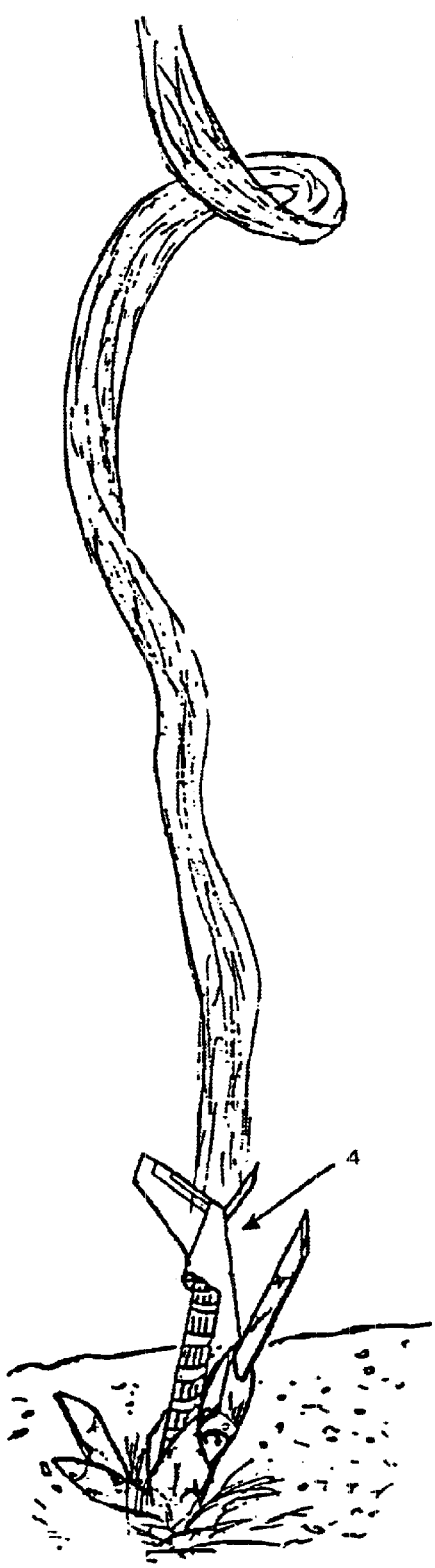
*Fig.* 2F
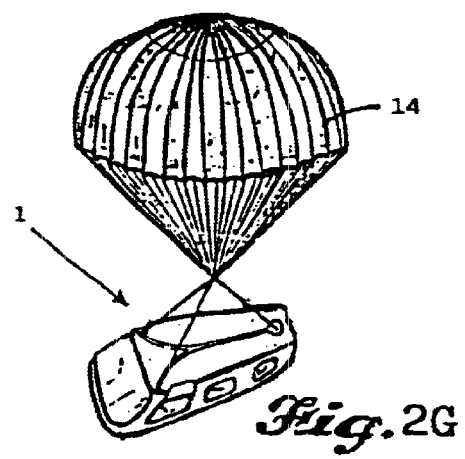
*Fig.* 2G
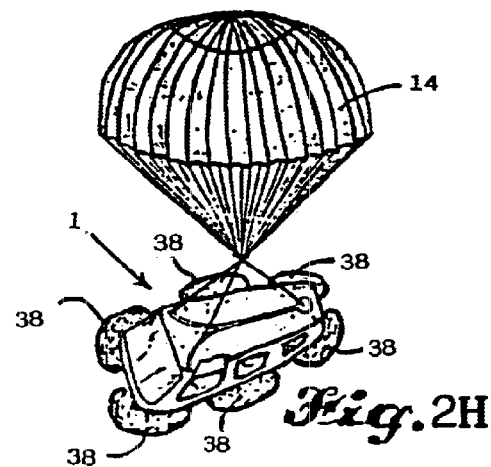
*Fig.* 2H
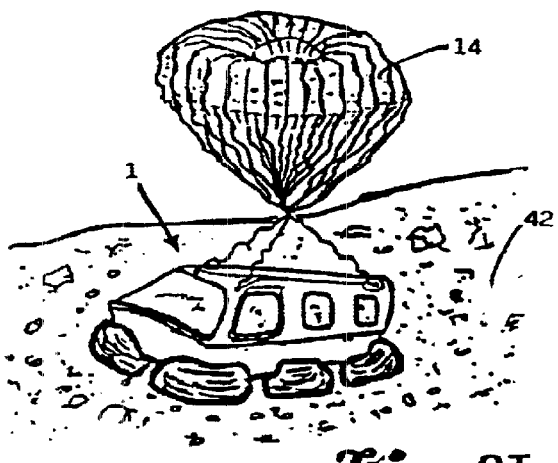
*Fig.* 2I

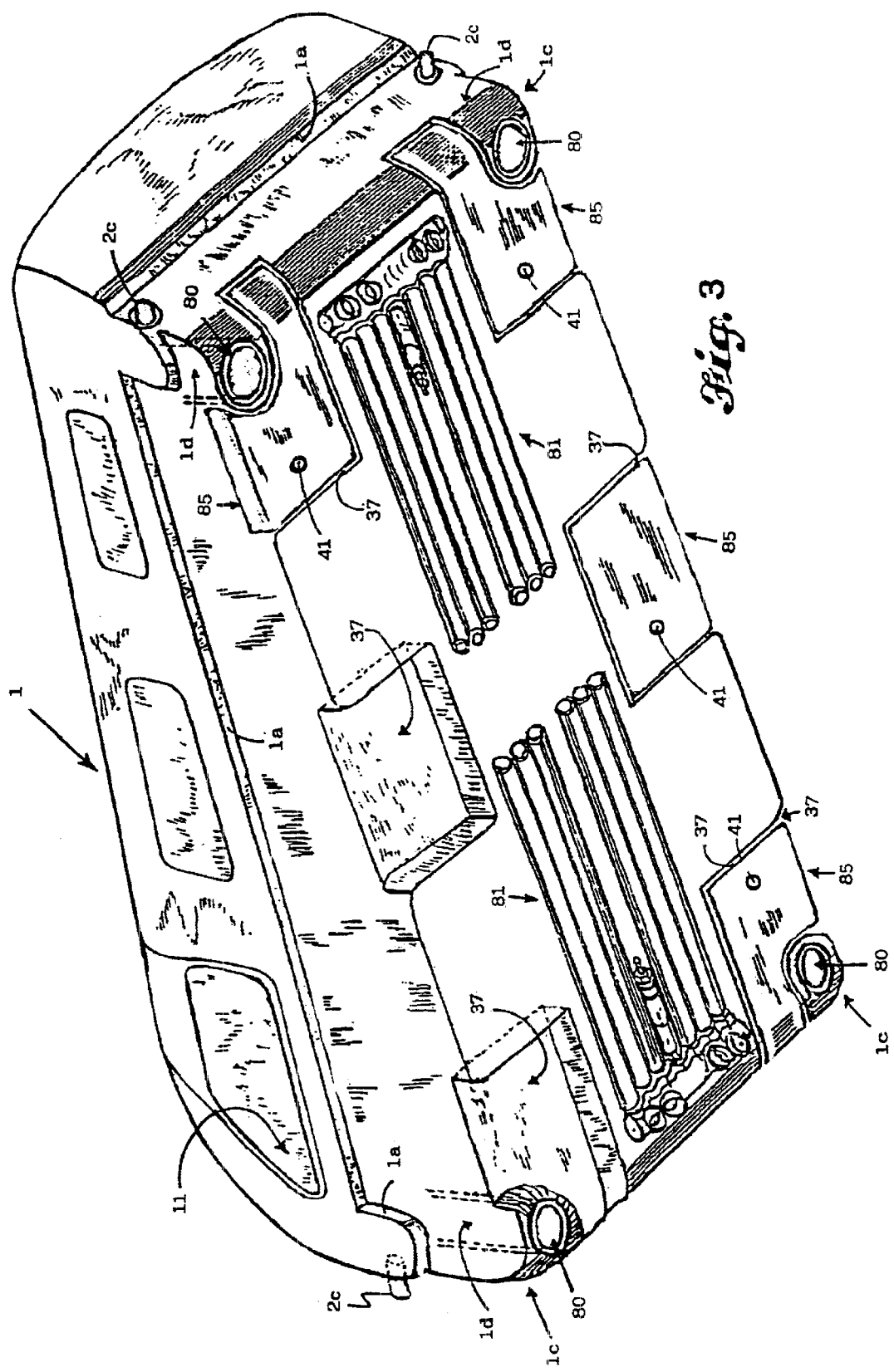

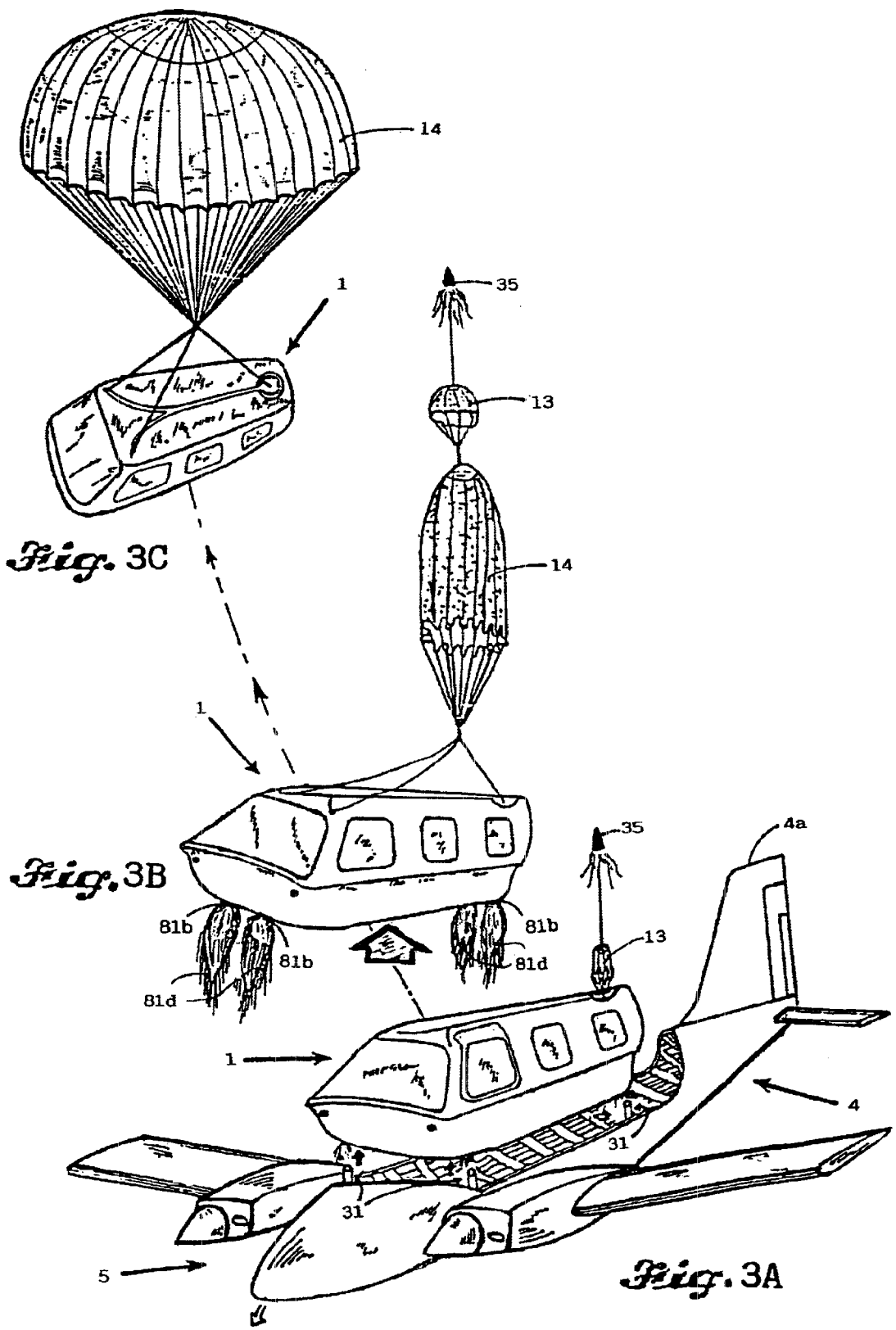

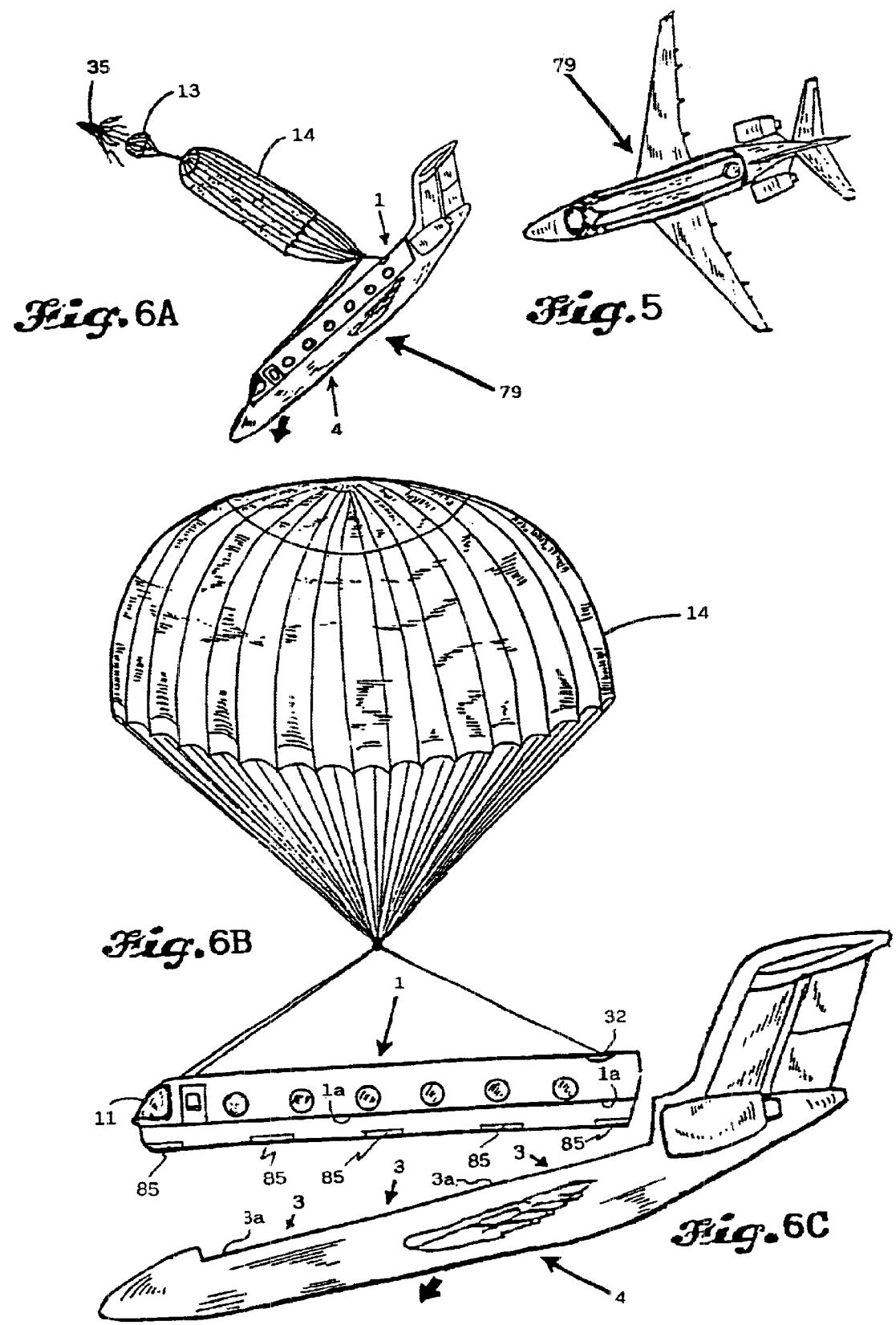

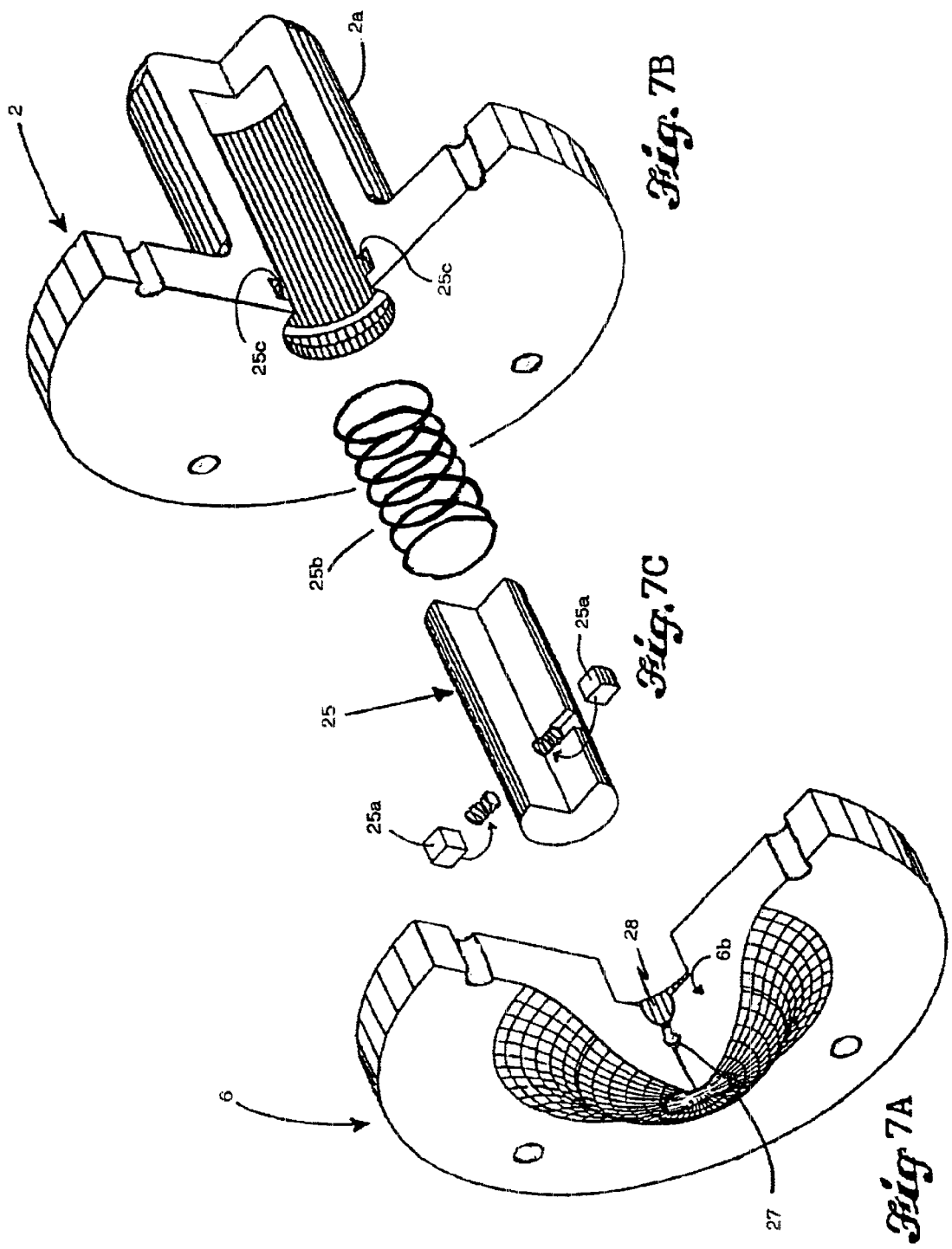

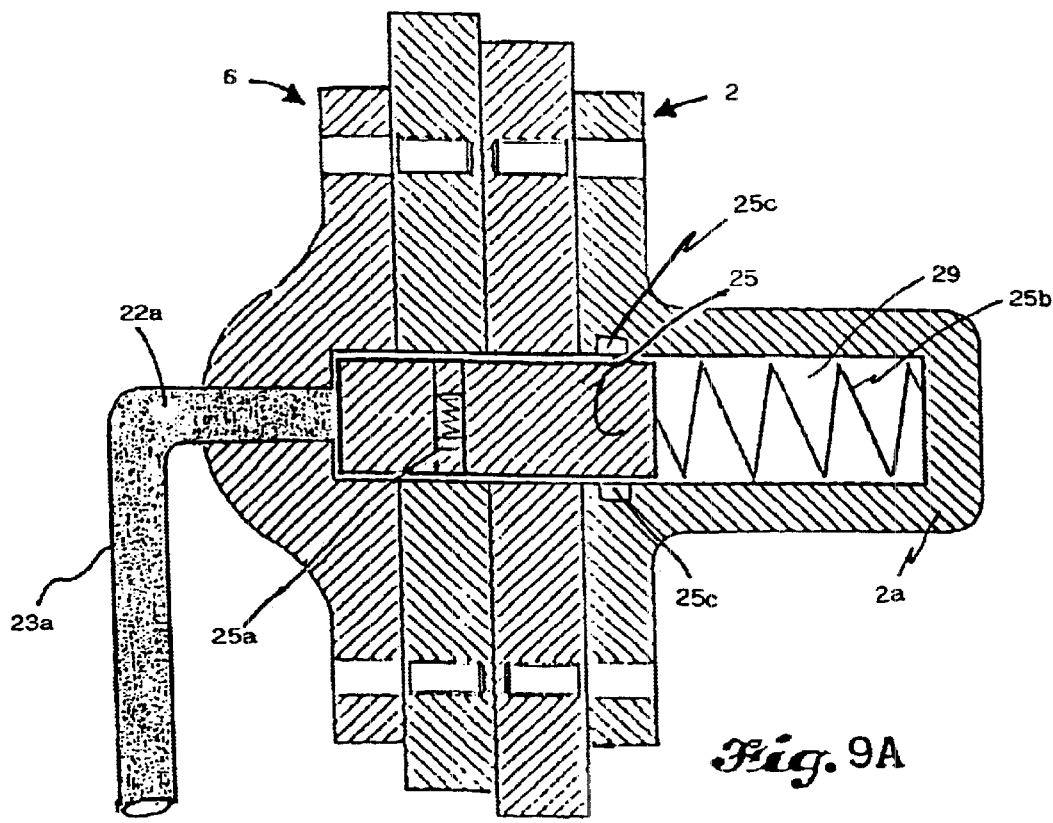
*Fig.* 9A
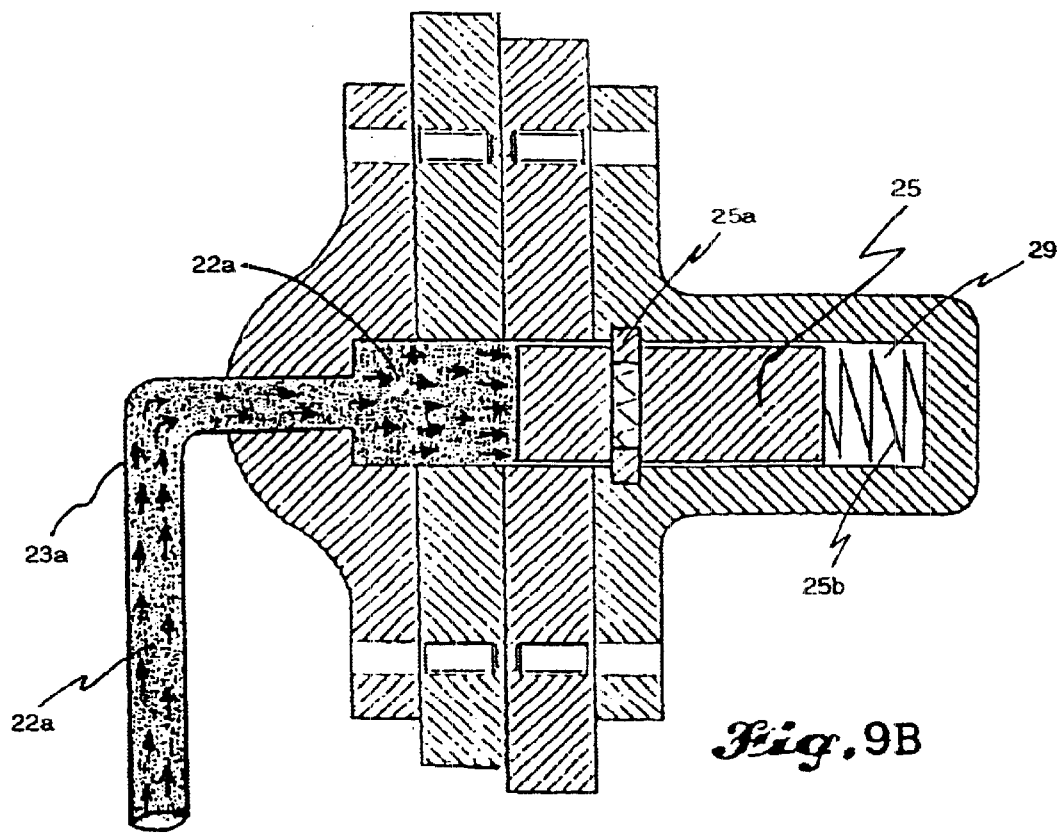
*Fig.* 9B

AIRCRAFT WITH A DETACHABLE PASSENGER ESCAPE CABIN AND AN AIRCRAFT WITH AIRBAGS The invention relates to the field of the art of aircraft emergency equipment and more specifically it relates to an aircraft comprising a detachable passenger escape cabin, which is mounted onto the fuselage of the aircraft via a speedily released set of connectors and is equipped with parachutes and airbags and with autonomous mechanisms ensuring its vertical upward detachment from the remainder of the airplane which is thence left to fall to the ground.

Various arrangements of aircraft emergency equipment have been disclosed in the prior art, that are aimed at saving the lives of passengers and crew in an aircraft which is faced with malfunction, fire and/or danger of explosion.

The combination of parachute/airbag systems deployed for aircraft emergency landing is known. U.S. Pat. No. 5,836,544, U.S. Pat. No. 5,944,282, DE-43 20 470 or DE-195 07 069 are examples of documents of the prior art wherein are presented alternative types of aircraft or helicopters in which an arrangement of suitably deployed parachutes is used in combination with an arrangement of airbags, so as to respectively ensure smooth descending to the ground and damp at the maximum possible extent the substantial forces being developed upon impact to the ground.

In an article published in Aviation Week & Space Technology (135-1991-December 16/23, No. 24/25, New York, US) USAF evaluates new parachute/airbag system for F-111 crew escape module and discloses efforts being made towards reducing the speed of falling of the escape module with the parachute and control the sink rate with the airbags, so as to reduce injury rate of the crew.

Furthermore, parachute/airbag arrangements have also been deployed for emergency landing of selected parts of aircraft equipment, such as the jetisonable aircraft fuel tank means proposed in U.S. Pat. No. 4,306,693.

Despite of the security improvement attained when such parachute/airbag arrangements are employed in aircraft vehicles, the danger remains since passengers and crew are adapted to perform this difficult and dangerous emergency flight to earth together with the entire aircraft vehicle, which, due to the malfunction and to the fact that it carries fuel or other combustibles, presents an eminent danger of explosion, both during the emergency landing, but also upon its impact on to the ground. Moreover the job of the parachute/airbag system is made much harder, since it has to cope with the excessive load of the aircraft body, engines and cargo unnecessary to care for under such emergency conditions.

To overcome the above drawbacks, solutions have been developed, wherein segments of the aircraft are proposed to be detachably mounted onto the body of the aircraft, so that they might be advantageously separated from the aircraft, so as to carry safely to the ground the passengers of the aircraft in case of emergency.

U.S. Pat. No. 5,356,097, U.S. Pat. No. 5,568,903, FR-855 642 and DE-198 47 546 provide examples in the prior art, wherein is proposed that aircraft's may, when emergency conditions arise, be segmented in portions, so as to facilitate safe landing to earth of passengers and/or crew. More particularly, DE-198 47 546 proposes the aircraft to be lengthwise divided in a frontal and a rear portion, wherein under emergency conditions passengers and crew are transferred to the frontal portion which is then laterally cut from the rear portion carrying cargo and fuel. Subsequently the frontal portion is lowered to earth with deployment of a balloon inflated with gas, lighter that the air, on the top thereof, whilst the rear portion falls onto the ground with a pair of parachutes.

Whilst in the above DE-198 47 546 a lateral division of the aircraft is being proposed, U.S. Pat. No. 5,356,097, U.S. Pat. No. 5,568,903 and FR-855 642 propose varying arrangements of longitudinally detachable portions of the aircraft being lowered to the ground with the aid of parachutes.

With the exception of U.S. Pat. No. 5,356,097, they however do not disclose usage of airbag impact absorbing means. In all these documents, the detachable aircraft portions are slidably connected onto suitable rails or track of the fuselage and when detached they carry along the tail portion (empennage tail) of the aircraft as well.

The problem arising with this type of structures is that their detachment from the remainder of the aircraft takes place within a certain period of time necessary for the detachable portion to slide off the fuselage; Even after sliding off, the detached portion may remain for an additional period of time in the vicinity of the remainder of the aircraft, thereby making it possible that an explosion takes place, which is always a possibility under such circumstances. Furthermore the inclusion of the tail portion in the detached portion creates unnecessary excessive load and causes problems in the deployment of parachutes, whereas the exclusion of the cockpit leaves the detachable portion without valuable flight controlling apparatus and instruments.

It is therefore an object of the present invention to overcome the above mentioned deficiencies in the prior art by proposing an aircraft with a detachable passenger escape cabin which extends longitudinally along the fuselage of the aircraft, includes the cockpit, but excludes the tail portion and whose detachment takes place in the vertical upward direction, thereby effecting an immediate moving away from the vicinity of the remainder of the aircraft wherein there always exists the risk of fire or explosion.

It is a further object of the invention to propose the above detachable cabin equipped with parachutes and airbags for its subsequent controlled falling onto the ground and with autonomous mechanisms of launching catapults and rocket motors, wherein the latter may selectively be employed to enhance speed of detachment and subsequently swiftly increase distance of the detached portion from the remainder of the aircraft.

It is a further object of the invention to propose various embodiments of a speedily released set of connectors between the detachable passenger escape cabin and the aircraft fuselage, thereby enhancing possibilities for attaining a fast detachment thereof.

Prior art devices relating to powered release of connectors accommodating hydraulic, pneumatic or pyrotechnic mechanisms of operation are disclosed in GB-2 237 839 or U.S. Pat. No. 5,755,407 or U.S. Pat. No. 6,029,932. However disclosures in the above documents do not pertain the specifically proposed characteristics of the mechanisms proposed in the present invention.

These and other objects, advantages and characteristics of the present invention will be disclosed in the herein below detailed description of preferred embodiments.

BRIEF DESCRIPTION OF DRAWINGS

The invention will be made apparent to those skilled in the art by reference to the accompanying drawings in which appear illustrative preferred embodiments thereof.

FIG. 1A illustrates a perspective view of the escape cabin, shown as detached from the aircraft's fuselage and prior to its eventual attachment onto the fuselage for the purpose of a proper flight operation.

FIG. 1B illustrates a perspective view of the aircraft's, fuselage, shown as detached from the escape cabin and prior to its eventual attachment to the latter for the purpose of a proper flight operation.

FIG. 1C illustrates a perspective view of the escape cabin being attached onto the aircraft's fuselage, such attachment having been implemented via a speedily released set of connectors, wherein this is the condition applicable during the regular flight operation of the aircraft.

FIG. 2F illustrates in perspective view the fuselage of FIG. 2E, which has crashed onto the Earth.

FIG. 2G illustrates in perspective view the escape cabin of FIG. 2C being sustained by its parachute while it is descending at a moderate speed.

FIG. 2H illustrates in perspective view the escape cabin of FIG. 2G as it is approaching the Earth and shortly before its impact on the ground with its exterior airbags having already been activated.

FIG. 2I illustrates in perspective view the escape cabin of FIG. 2H at the moment of its impact on the ground, wherein the airbags absorb the energy released as a result of the collision.

FIG. 3 illustrates a bottom planar view of the escape cabin of the invention, wherein details are shown of rapid ejection equipment, which is housed within and outside the cabin's floor and specifically onto its bottom exterior surface.

FIG. 3A illustrates in perspective view the escape cabin of FIG. 3 during its initial ejection phase from the fuselage of the aircraft with catapults, also depicting details of the initial phase in the deployment of its parachutes.

FIG. 3B illustrates in perspective view the escape cabin of FIG. 3A during its second ejection phase, which occurs by means of the activated rocket motors as it is rapidly being drawn away from the fuselage whilst at the same time deployment of the parachutes takes place.

FIG. 3C illustrates in perspective view the escape cabin of FIG. 3B during its final ejection phase, as it has moved away from the fuselage and its main parachute has been fully deployed to effect the cabin's smooth descending to Earth.

FIG. 5 illustrates in top view a wide body jet airliner the diving of which towards the Earth has been initiated due to the aircraft's engine failure.

FIG. 6A illustrates a side view of the jet airliner of FIG. 5 at a condition of fast diving to the earth as well as its parachute equipment been activated.

FIG. 6B illustrates a side view of the escape cabin as detached from the jet airliner's wide body fuselage of FIG. 6A, whilst the cabin is sustained by its main parachute that is fully deployed.

FIG. 6C illustrates a side view of the detached jet airliner's wide body fuselage, shown in FIG. 6A, which has started to dive freely and rapidly towards the Earth resulting to its crash.

FIG. 7A illustrates in both a perspective and a sectional view one of the pair of connection members employed in each one of the speedily released connectors of the invention, with details of the space wherein the pyrotechnic mechanism is installed.

FIG. 7B illustrates in both a perspective and a sectional view the other one of the pair of connection members employed in each one of the speedily released connectors of the invention, showing details of the housing it consists of.

FIG. 7C illustrates in perspective view the components housed within the abovementioned connection members, such as the piston and the spring catch means.

FIG. 9A illustrates in sectional view an alternative pneumatic mechanism, by means of which movement of the piston and detachment of the escape cabin and fuselage components is effected, this mechanism being depicted at a condition prior to its activation.

FIG. 9B illustrates in sectional view the mechanism of FIG. 9A, after its activation.

FIG. 11A illustrates in perspective view one of the telescopically cooperating pair of pipes that the vertically oriented catapult of FIG. 11 consists of.

FIG. 11B illustrates in perspective view the other one of the telescopically cooperating pair of pipes that the vertically oriented catapult of FIG. 11 consists of.

DETAILED DESCRIPTION OF PREFERRED EMBODIMENTS

Figure 1D:
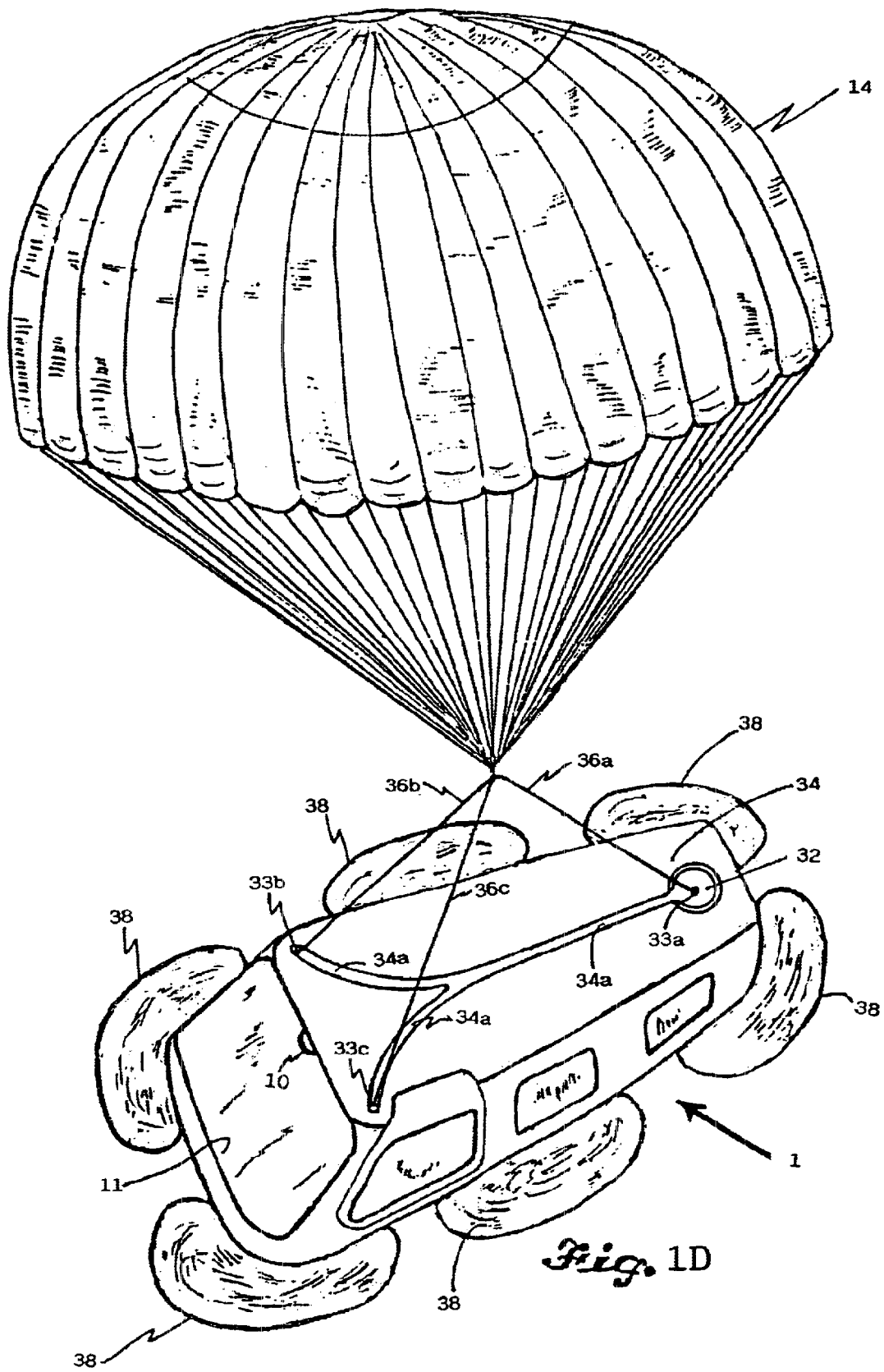
FIG. 1D illustrates in perspective view the detached escape cabin during its descent to Earth, the cabin being sustained by its parachute and with its exterior airbags activated, as well as details of the parachutes' storage area, the small rocket and the storage space of the parachute's cables along with their connection points with the escape cabin.

With reference to the accompanying drawings, we will hereinafter describe illustrative, preferred embodiments of the invention.

According to a first illustrative preferred embodiment of the invention the morphology of the proposed escape cabin 1, as illustrated as a detached escape cabin 1 in FIG. 1A, is that of a longitudinal independent compartment with lengthwise rounded edges, whereas its length is significantly larger than its width and the length: width ratio indicatively lies at the region of 2.5:1. Furthermore, the detached fuselage 4 is illustrated in FIG. 1B, whereas in FIG. 1C the fuselage and the escape cabin are illustrated in assembled condition on the aircraft 5.

The escape cabin 1 is a heavy-duty and light-weighted structure which can be made from any suitable material being in use today or other suitable material that may be used in the future and includes equipment consisting of parachutes, catapults, rocket motors and airbags, as well as a speedily released set of connectors for the connection of the escape cabin onto the fuselage 4 of the aircraft.

The strong framework of the fuselage 4 along which the escape cabin 1 is mounted comprises an opening 3 for reception of the escape cabin 1 which includes the cockpit 11 but excludes the tail portion 4a of the aircraft and is detached in a vertical upward direction when emergency conditions arise. The configuration of opening 3 of the fuselage 4 is such as to be brought in matching contact with the escape cabin 1 having a corresponding configuration, when a circumferential projection 1a (FIG. 1A and FIG. 3) of escape cabin 1 sits upon a correspondingly shaped circumferential supporting basement 3a (FIG. 1B) around the perimeter of the opening 3 of the fuselage 4. Connection of the escape cabin 1 onto the fuselage 4 of the aircraft is effected by means of a speedily released set of connectors. In FIG. 1C the final aircraft 5 is shown in assembled condition. The especially shaped inner hollow opening 3 of the fuselage 4 having a configuration corresponding to that of the escape cabin 1 and at an equivalent length: width ratio of the order of 2.5:1.

Aiming to the provision of the necessary safety for the cabin's passengers, the escape cabin 1, as illustrated in the corresponding Figures, comprises a compact structure with doors and portholes, including the cockpit 11 with the transparent cockpit canopy 11a, seats for the pilots, the instrument panel, whereas during the instant of the cabin's release all cockpit joints etc. that were previously connected with the fuselage 4 of the aircraft 5 are detached.

At a suitable point on the exterior side of the roof 34 of the escape cabin 1 and specifically at the rear part thereof that is close to the vertical stabilizer 4a (FIG. 1D), there is provided a hole 32 within which are stored the ballistic type parachutes 13, 14 along with the small rocket 35 for the launching thereof, which is connected with the smaller parachute 13. In particular, and in order that the main parachute 14 is successfully deployed, as shown in FIG. 2A, the smaller parachute 13 that drags the main parachute 14 should be deployed first and this is achieved by launching initially the small rocket 35 that drags the small auxiliary parachute 13.

Figure 2A:
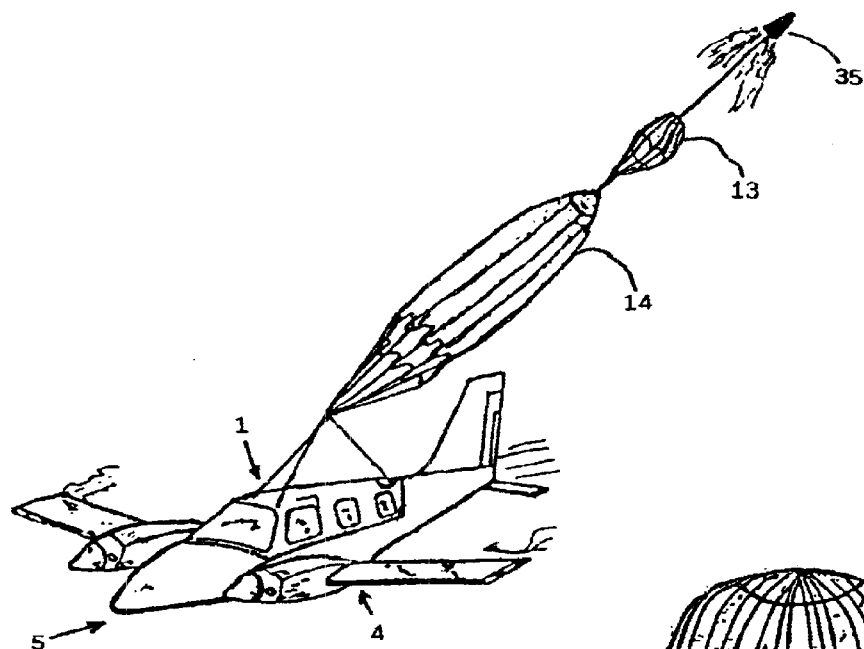
FIG. 2A illustrates in perspective view the aircraft of FIG. 1C during its fall in the air with its parachute system having been deployed.

The escape cabin 1 is connected by means of an arrangement of cables 36a, 36b, 36c of the main parachute 14 at the points 33a, 33b, 33c of the exterior side of the cabin's top roof (FIG. 1D). These cables are stored under normal circumstances within the special grooves 34a of the cabin's top 34.

The speedily released set of connectors being employed in securely connecting escape cabin 1 onto the opening 3 of the fuselage 4 comprises a plurality of connection members 2 fixedly mounted at a circumferential arrangement of points of escape cabin 1 below the abovementioned circumferential projection 1a thereof and a corresponding plurality of connection members 6 fixedly mounted at a circumferential arrangement of points of the fuselage 4 located so as to come into matching contact with the above mentioned connection members 2 of the escape cabin 1. A longitudinally extending chamber 29 is being formed in between each one of the pairs of connection members 2 and 6 and a piston 25 bearing spring catch means 25a is provided within the chamber 29 wherein the piston 25 and associated spring catch means 25a is pressed into a locked condition of connection members 2 and 6 by means of a compression spring 25b and wherein via manipulation of an operating lever 10 located within the cockpit 11 of the aircraft (FIG. 1D), a mechanism is activated which results in piston moving linearly within chamber 29 in the direction of compression of compression spring 25b and eventually resulting into release of spring catch means 25a and subsequent disengagement of connection members 2,6, thereby leading to a corresponding unlocked condition of connection members 2,6.

Figure 7D:
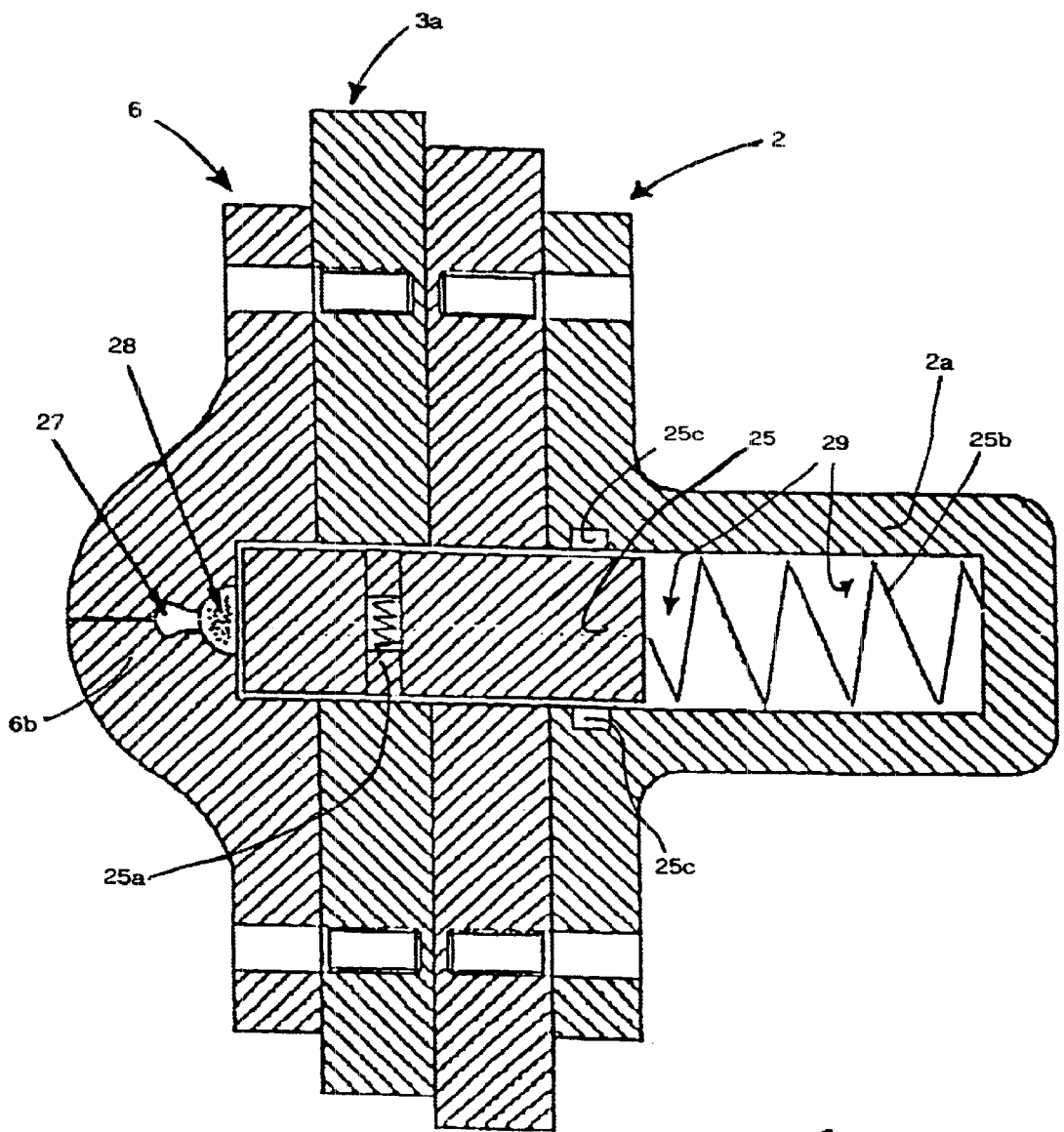
FIG. 7D illustrates in sectional view the assembled pair of connection members employed in each one of the speedily released connectors of the invention as shown in FIGS. 7A–7C, such assembly operating by means of a pyrotechnic mechanism while it illustrates the way in which these connection members are connected on the escape cabin and the fuselage respectively.
Figure 7E:
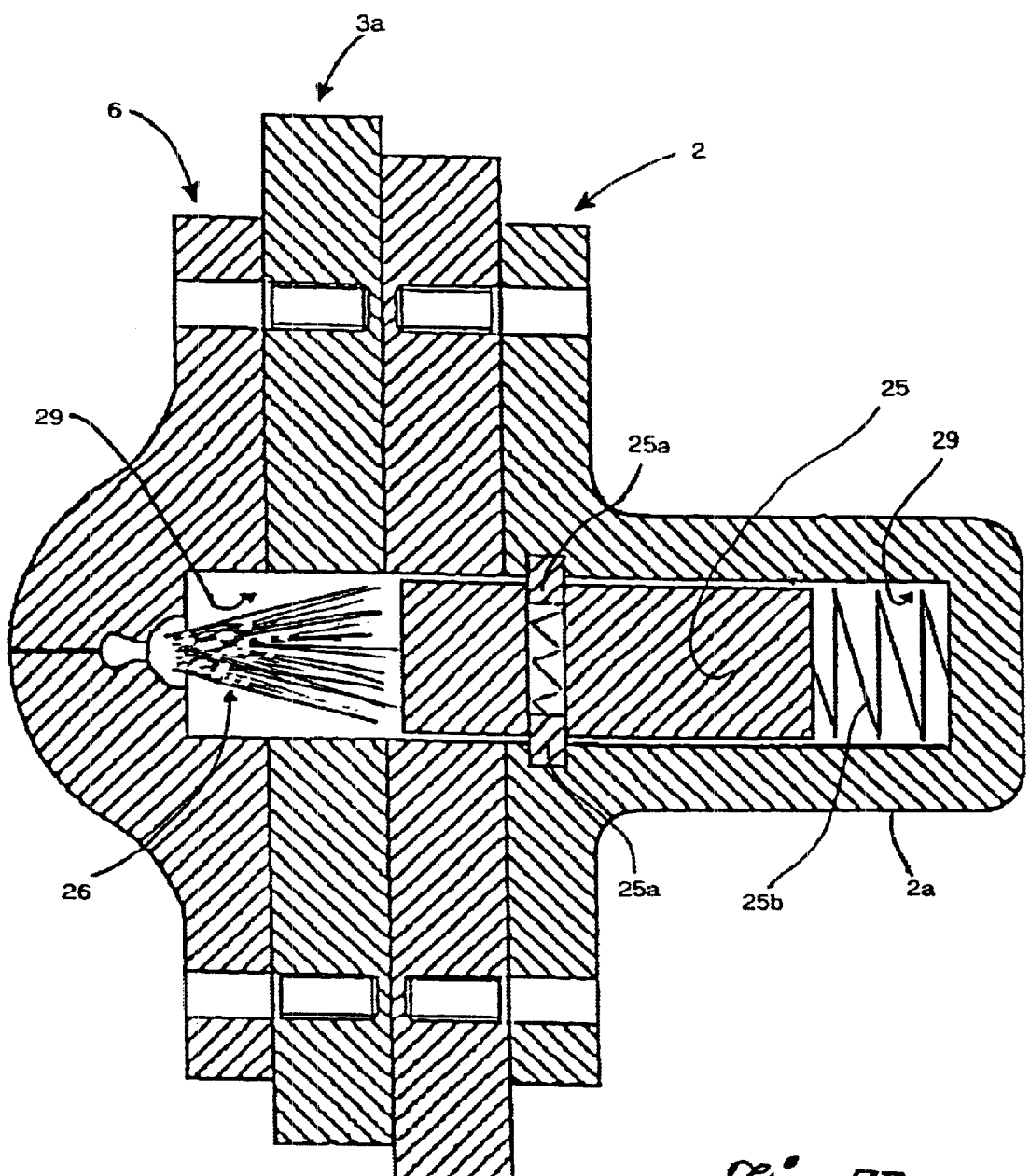
FIG. 7E illustrates in sectional view the mechanism shown in FIG. 7D, at the instant in which the material contained therein explodes and results in movement of the piston and detachment of the escape cabin and fuselage components.

The connection member 6 carries the housing 6b (FIG. 7A) and is permanently fixed at corresponding points into the opening 3 of the fuselage 4. Moreover, the piston 25 with the fuses 25a and the spring 25b are illustrated in FIG. 7C. More analytically, the connection mode of the escape cabin 1 with the fuselage 4 is illustrated in the sectional view of FIG. 7D where the connection member 2 is shown as fixedly mounted on the segment 1b that belongs to the escape cabin 1, whereas the connection member 6 is shown as fixedly mounted on the circumferentially extending supporting basement 3a around the opening 3 that belongs to the fuselage 4. The piston 25 in the interior of the chamber 29 holds firmly connected the two parts by means of the compression spring 25b. In the housing 6b there is also the detonator 27 and the explosive material 28.

The disconnection of the detachable connection members 2 and 6 is achieved in a plurality of manners by means of respective pyrotechnic or hydraulic or pneumatic or mechanically operated mechanisms, whilst, irrespectively of the type of mechanism employed, these are activated at the ultimate moment and at the pilot's will by pulling the operating lever 10 in the cockpit 11 (FIG. 1D).

In accordance with one preferred embodiment of the invention, as depicted in FIGS. 7A, 7B, 7C, 7D, 7E the mechanism being activated so as to effect linear movement of piston 25 within chamber 29 resulting into disengagement and unlocked condition of connection members 2,6 is a pyrotechnic mechanism comprising explosive material 28 being located in a cavity at one end of the chamber 29 whereupon sits the piston 25 when the connection members 2,6 are brought into a locked condition and a detonator device 27 by means of which explosion of explosive material 28 is initiated so as to effect linear movement of piston 25, release of associated spring catch means 25a and subsequent disengagement and bringing of connection members 2,6 into an unlocked condition.

Figure 8A:
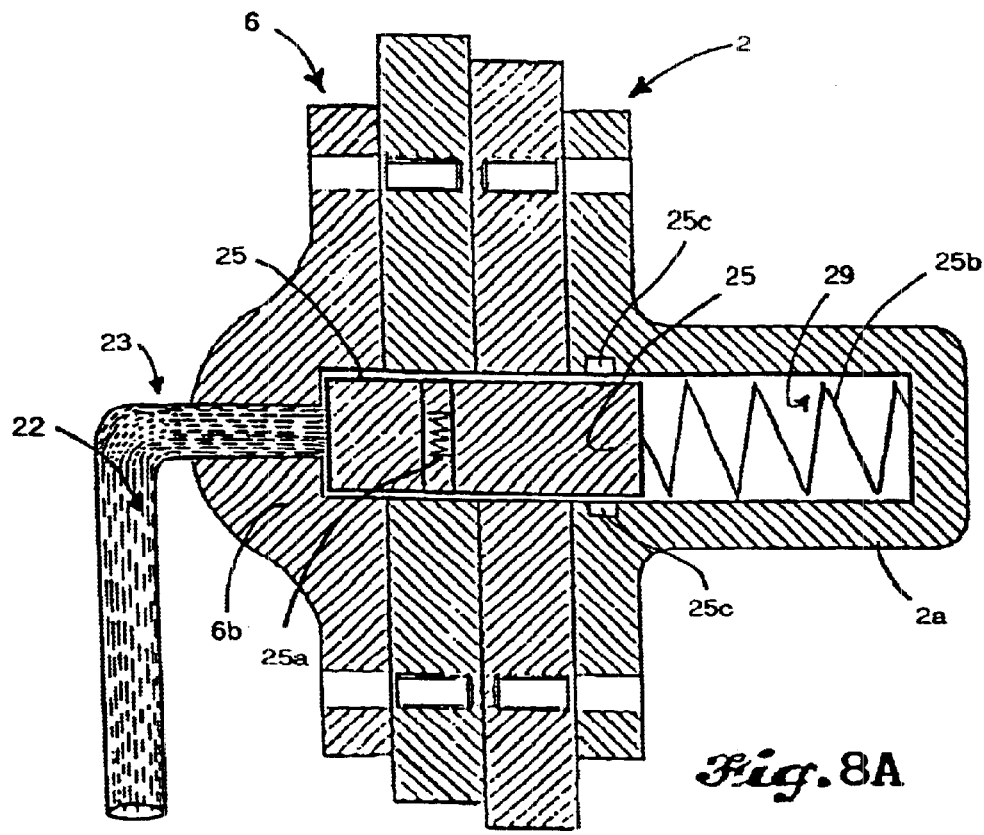
FIG. 8A illustrates in sectional view an alternative hydraulic mechanism, by means of which movement of the piston and detachment of the escape cabin and fuselage components is effected, this mechanism being depicted at a condition prior to its activation.
Figure 8B:
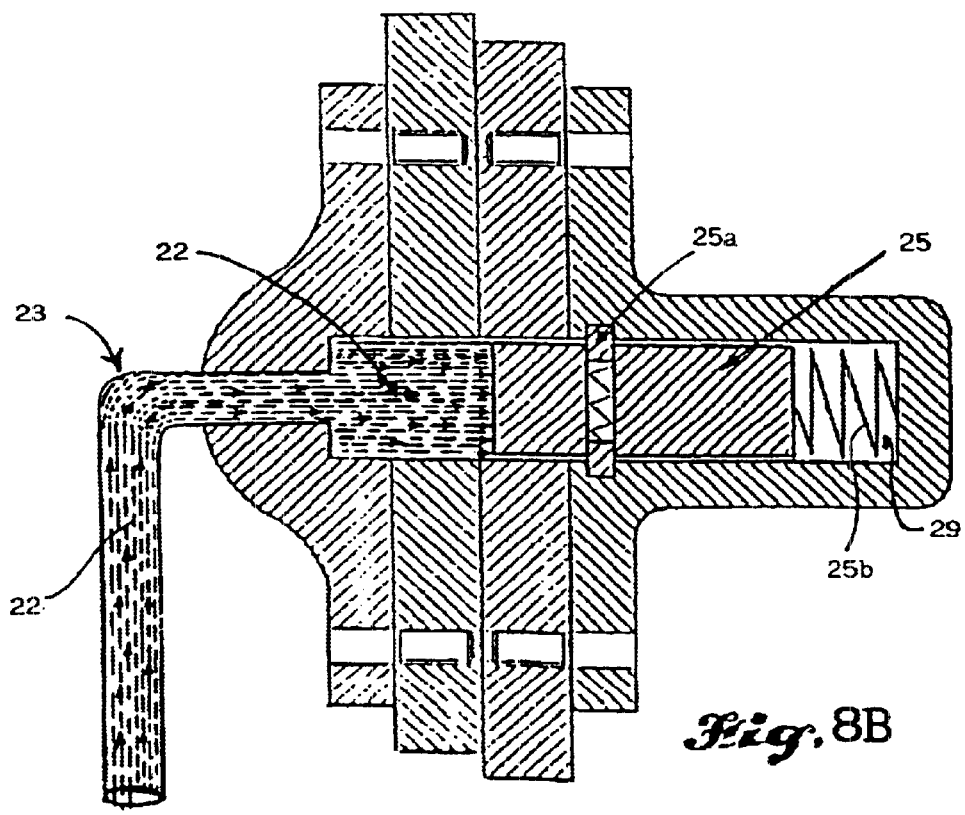
FIG. 8B illustrates in sectional view the mechanism of FIG. 8A after its activation.

In accordance to an alternative embodiment of the invention, as shown in FIGS. 8A–8B, the mechanism being activated so as to effect linear movement of piston 25 within chamber 29 resulting into disengagement and unlocked condition of connection members 2,6 is an hydraulic mechanism comprising a pipe 23 carrying a special fluid 22 into a cavity at the end of chamber 29 whereupon sits the piston 25 when the connection members 2 and 6 are at a locked condition, wherein this hydraulic type of mechanism is activated when the pressure of the special fluid 22 is increased so as to effect linear movement of piston 25, release of associated spring catch means 25a and subsequent disengagement and bringing of connection members 2,6 into an unlocked condition.

In accordance to another alternative embodiment of the invention, as shown in FIGS. 9A–9B, the mechanism being activated so as to effect linear movement of piston 25 within chamber 29 resulting into disengagement and unlocked condition of connection members 2,6 is a pneumatic mechanism comprising a pipe 23a carrying compressed air 22a into a cavity at the end of chamber 29 whereupon sits the piston 25 when the connection members 2 and 6 are at a locked condition, wherein this pneumatic type of mechanism is activated when the pressure of compressed air medium 22a is increased so as to effect linear movement of piston 25, release of associated spring catch means 25a and subsequent disengagement and bringing of connection members 2,6 into an unlocked condition.

Figure 10A:
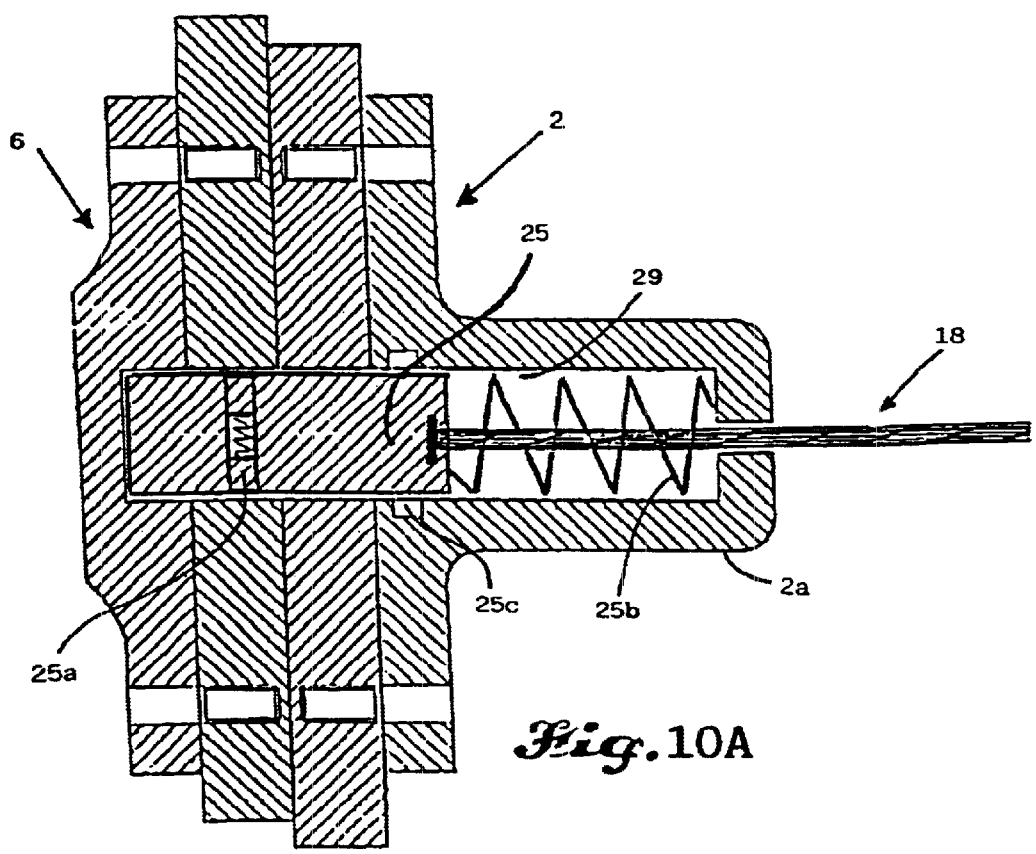
FIG. 10A illustrates in sectional view an alternative mechanically activated mechanism, by means of which movement of the piston and detachment of the escape cabin and fuselage components is effected, this mechanism being depicted at a condition prior to its activation.
Figure 10B:
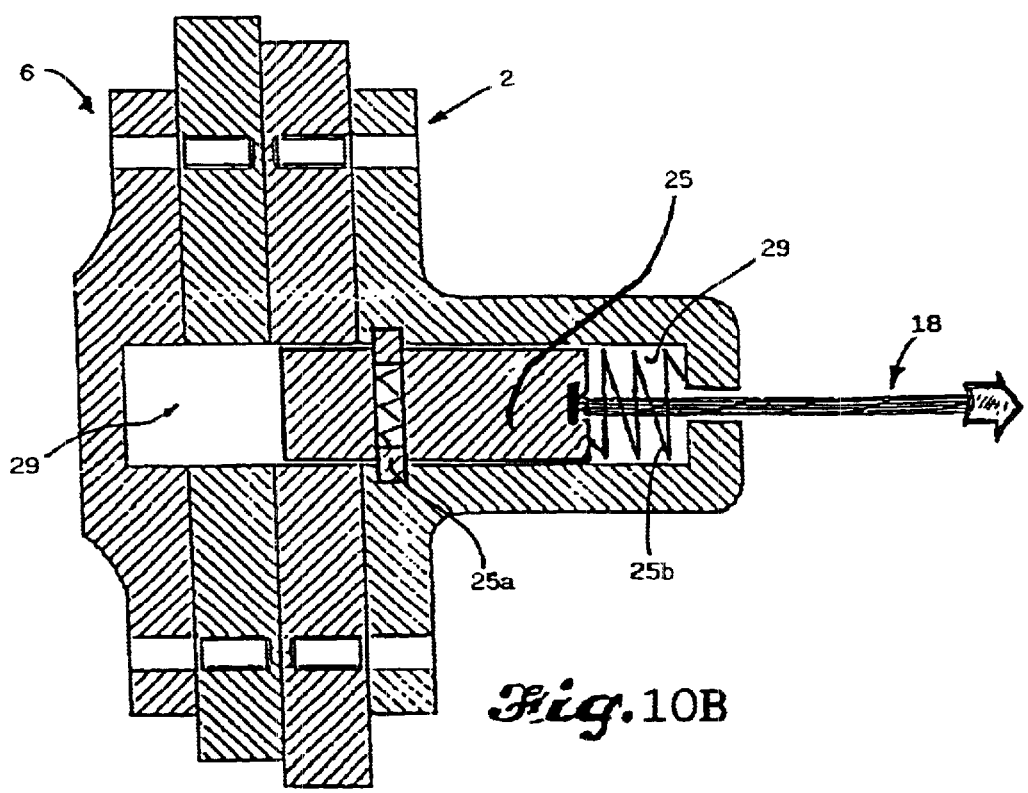
FIG. 10B illustrates in sectional view the mechanism of FIG. 10A after its activation.

In accordance to another alternative embodiment of the invention, as shown in FIGS. 10A–10B, the mechanism being activated so as to effect linear movement of piston 25 within chamber 29 resulting into disengagement and unlocked condition of connection members 2,6 is a mechanically activated mechanism comprising a wire rope 18 being connected to the piston 25. This mechanism is activated when, via manipulation of the operating lever 10 located in the cockpit 11, a linear traction is exerted onto the wire rope 18 and subsequently onto piston 25, so as to effect its linear movement, release of associated spring catch means 25a and subsequent disengagement and bringing of connection members 2,6 into an unlocked condition.

As shown in FIGS. 1A and 1B respectively, connection members 2 and 6 of each one of the speedily released set of connectors are correspondingly mounted at points 2c around the perimeter of the escape cabin 1 and at points 6c around the perimeter of the opening 3 of fuselage 4. Points 2c and 6c are preferably arranged at the four edges and lengthwise the cabin and fuselage respectively.

When conditions for detachment of the passenger escape cabin 1 arise, the cabin may be detached either through smooth detachment after leveling off of the aircraft or through a rapid ejection process if extremely adverse conditions arise.

For effecting either one of the above alternative modes of detachment, the escape cabin 1 is equipped with an arrangement of parachutes 13, 14 and means of deployment thereof, an arrangement of airbags 38 and for effecting the rapid ejection process in particular the escape cabin 1 is provided with an arrangement of launching catapults 80 and rocket motors 81 for obtaining an enhanced speed of vertical upward movement in the detachment thereof.

Next we will describe the smooth mode of detachment of cabin 1 from the aircraft 5 when time allows or when there is not an imminent risk of fire or even when the rapid ejection escape system is not provided.

In FIG. 2A, the aircraft 5 has started to dive towards the Earth when the pilot has already activated the ballistic parachute system 13, 14 by means of the small rocket 35, resulting in the deployment of the main parachute 14 with the aid of the small parachute 13 that is pulled by the small rocket 35.

Figure 2B:
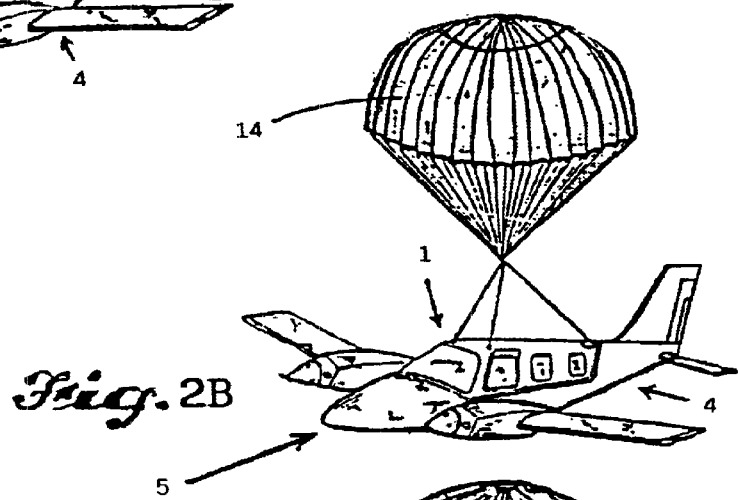
FIG. 2B illustrates in perspective view the aircraft of FIG. 2A with its main parachute fully deployed so that the aircraft will perform a leveling off operation prior to the detachment of the escape cabin from the fuselage.

In FIG. 2B the aircraft 5 has leveled off since it is sustained by the main parachute 14, which is fully deployed, whilst at the same time the disconnection of the detachable joints 2 and 6 is automatically initiated.

The aircraft 5 of the preferred embodiment to which reference is made is a lightweight passenger aircraft with the possibility of carrying eight passengers. However the invention is not limited to this aircraft size.

Figure 2C:
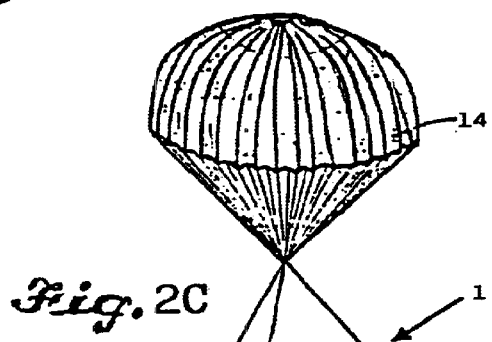
FIG. 2C illustrates in perspective view the escape cabin of the aircraft illustrated in FIG. 2B having been detached from its fuselage whereas it is sustained by the cabin's parachute.

In FIG. 2C, the escape cabin 1 has been now detached from the fuselage 4 and continues its descent to Earth being restrained by the main parachute 14.

Figure 2D:
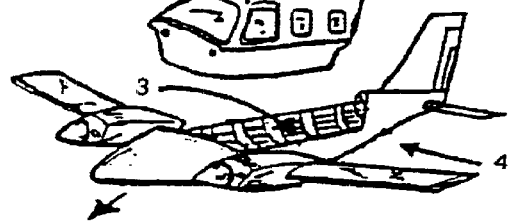
FIG. 2D illustrates in perspective view the fuselage of the aircraft of FIG. 2B, following detachment of the escape cabin, during its free rapid fall.

In FIG. 2D the detached fuselage 4 is freely and rapidly descending to Earth.

Figure 2E:
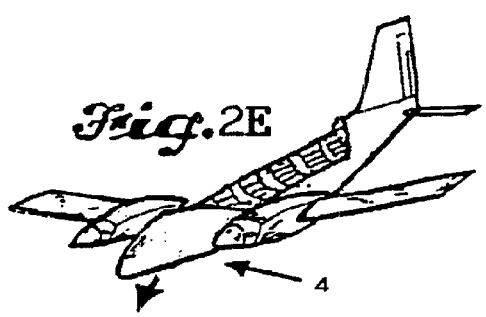
FIG. 2E illustrates in perspective view the fuselage of FIG. 2D in a condition of fast diving.

In FIG. 2E the detached fuselage 4 continues its fast diving to Earth.

In FIG. 2F the detached fuselage 4 has crashed on the Earth's ground and it is ruined.

In FIG. 2G the detached escape cabin 1 is slowly continuing to descend being sustained by the parachute 14.

In FIG. 2H the detached escape cabin 1 is approaching the ground and at a predetermined height, the sensors 41 have activated its external airbags 38 and they are prepared for the oncoming crash on the Earth's ground 42.

In FIG. 2I the detached escape cabin 1 has already reached and crashed on the Earth's ground 42, wherein the provision of airbags 38 results in the absorption of part of the energy produced during the crash, thereby preventing the exertion of the impact load onto the passengers that are seated within the cabin.

Next we will describe the mode of rapid ejection of the escape cabin 1, which is detached through its rapid ejection from the aircraft 5 when there is no time available or when the aircraft is on fire.

The success of the escape cabin 1, which is constructed with the characteristic feature of being ejected in a vertical upward direction, is clearly an issue of the effective design of the propulsive system. The reason is that, in order to enable a proper vertical upward movement, the necessary power should be generated. The vertical ejection however demands the development of an impulse (I) that is greater than the weight (W) of the escape cabin 1 in order that a safety margin for the sufficient upward movement is provided. By approximation, production of an excessive impulse at the range of 20% is desirable so that certain acceleration margins are allowed, which however shouldn't exceed a certain high acceleration value so that the energy developed will not exert undesirable stress upon the passengers' spinal column, etc. This prescribes an I/W ratio that equals to a minimum of 1.2 at least. The vertical impulse deflection is not sufficient for the ascending of the escape cabin 1 as it occurs for instance in the case of a rocket. The problem that arises is related to the balance of torques developing, due to the fact that the impulse will not be applied precisely at the center of gravity of the escape cabin 1.

If then a force tends to elevate the rear part of the escape cabin 1 the same should also occur for its frontal part. Thus there will be no unrestrained movement of the frontal part of the cockpit 11, either upwards or downwards. In other words, stability is ensured with respect to the pitch axis of the aircraft.

Nevertheless, the stability around the longitudinal axis or the roll axis should also be ensured. Therefore, in the front, back, right and left of the center of gravity of the escape cabin 1, the application of suitable forces is required in order that the possibility of vertical upward movement—ejection is allowed. On the basis of how these forces will be produced and to which direction they will be applied various methods can be found. The system that will be used should have small dimensions and weight so that it will not restrain the maximum effective space allowed as well as the weight of the escape cabin 1.

According to a preferred embodiment, the propulsive mechanism of effecting a linear acceleration is operating in two stages and consists of two telescopically connected pipes 30, 31 of a launching catapult 80, as well as by a cartridge system of rocket-motor 81.

The launching system of the catapults 80 and their points of attachment onto the escape cabin 1, as well as of the rocket motors 81 are shown in detail in FIG. 3 where the escape cabin of the invention is illustrated in a bottom planar view.

Figure 11A:
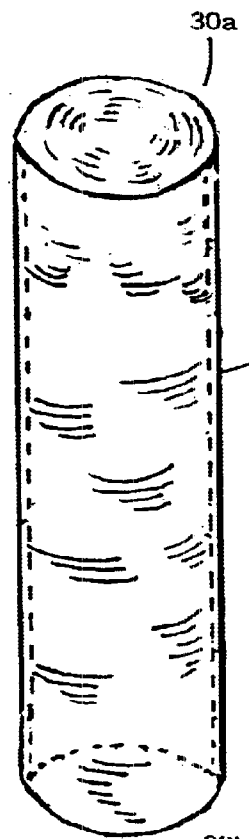
Figure 11:
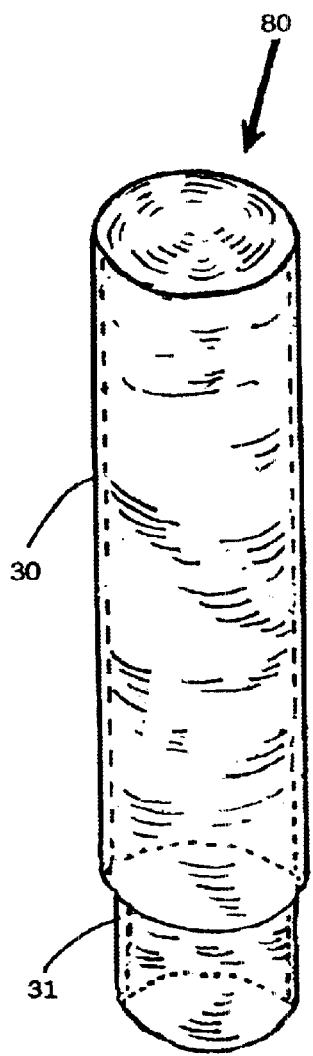
FIG. 11 illustrates a perspective overall view of the vertically oriented launching catapult.

More analytically, the vertically oriented launching catapult 80 as shown in FIG. 11 is housed within the vertically extending openings 1d at the four corners 1c that are formed along the external floor (FIG. 3) of the escape cabin 1.

Figure 11C:
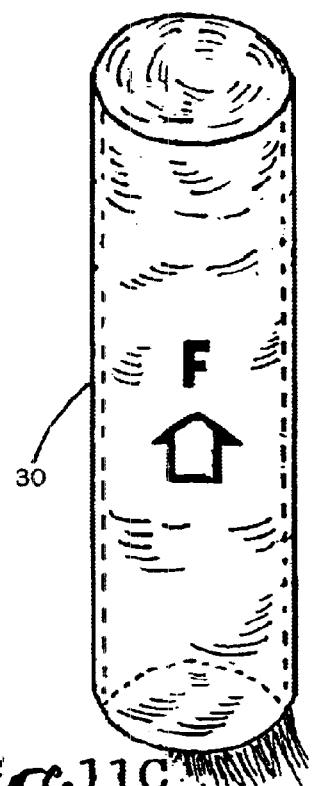
FIG. 11C illustrates in perspective view one of the telescopically cooperating pair of pipes that the vertically oriented catapult of FIG. 11 consists of as it is vertically launched following ignition of the explosive material contained within the launching catapult.
Figure 11B:
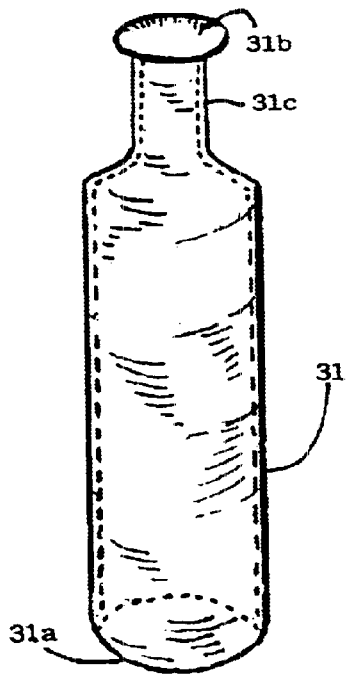
Figure 11D:
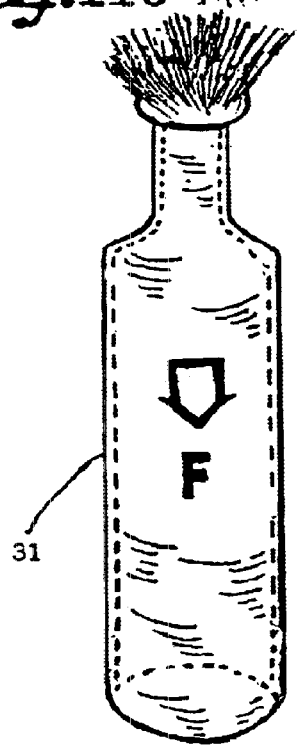
FIG. 11D illustrates in perspective view the other one of the telescopically cooperating pair of pipes that the vertically oriented catapult of FIG. 11 consists of as it is vertically launched in a linear direction opposite to the direction of movement of the pipe of FIG. 11C.

The catapult 80 consists of the two pipes 30, 31, which operate like telescopic pistons, one of them being inserted within the other. As illustrated in FIG. 11A, the pipe 30 has an upper closed end 30a and a lower open end 30b, and it is vertically stored in the escape cabin 1 as described above. The other pipe 31 (FIG. 11B) has a lower closed end 31a and an upper open-end 31b, which is the end of a narrowed throat portion 31c, the purpose of the latter being the increase of the impulse during explosion. The pipe 31 has a smaller diameter than the other pipe 30 so that it may be inserted within the latter without any tolerance being allowed. The pipe 31 is filled with a predetermined quantity of explosive material, which, when ignited, detaches and draws telescopically apart the two pipes, i.e. during a first stage of launching operation of the passenger escape cabin 1 the pipe 30 (FIG. 11C) which is boxed in the escape cabin 1, is telescopically moved away and it is linearly exerted from the other pipe 31 (FIG. 11D), thereby forming a supporting strut of the escape cabin 1 on the fuselage 4.

Figure 11E:
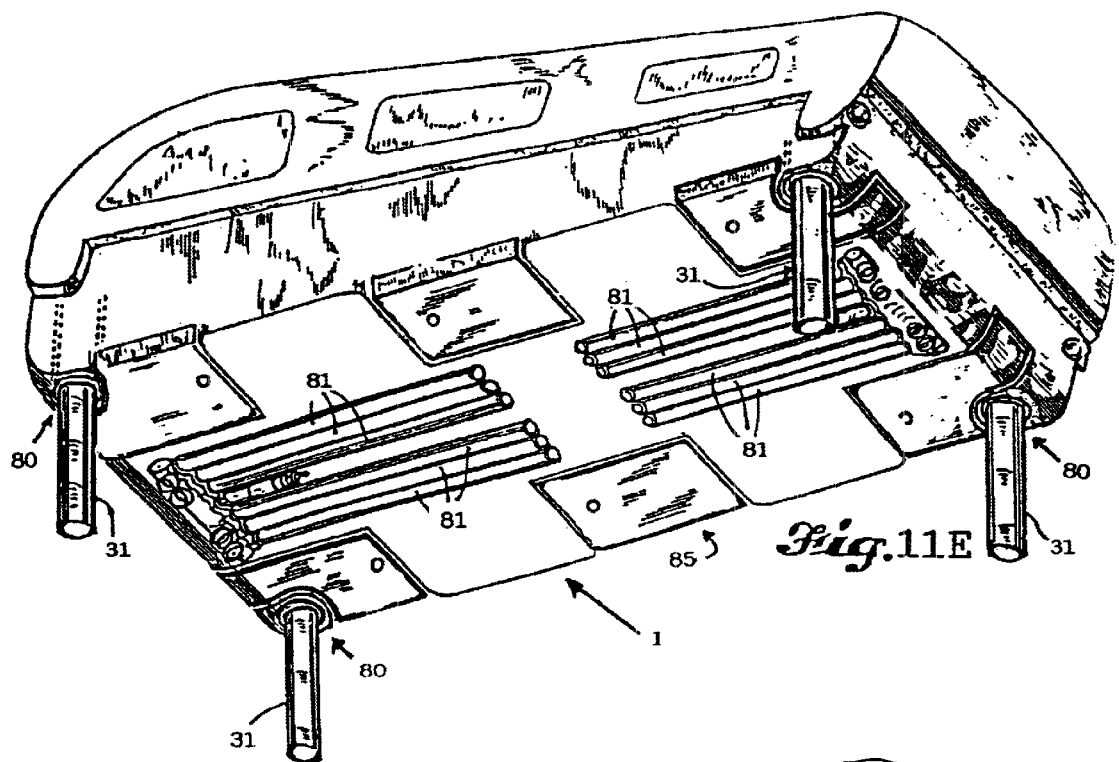
FIG. 11E illustrates a bottom planar view of the escape cabin at the instant of its vertical ejection by means of deployment of the launching catapults.
Figure 11F:
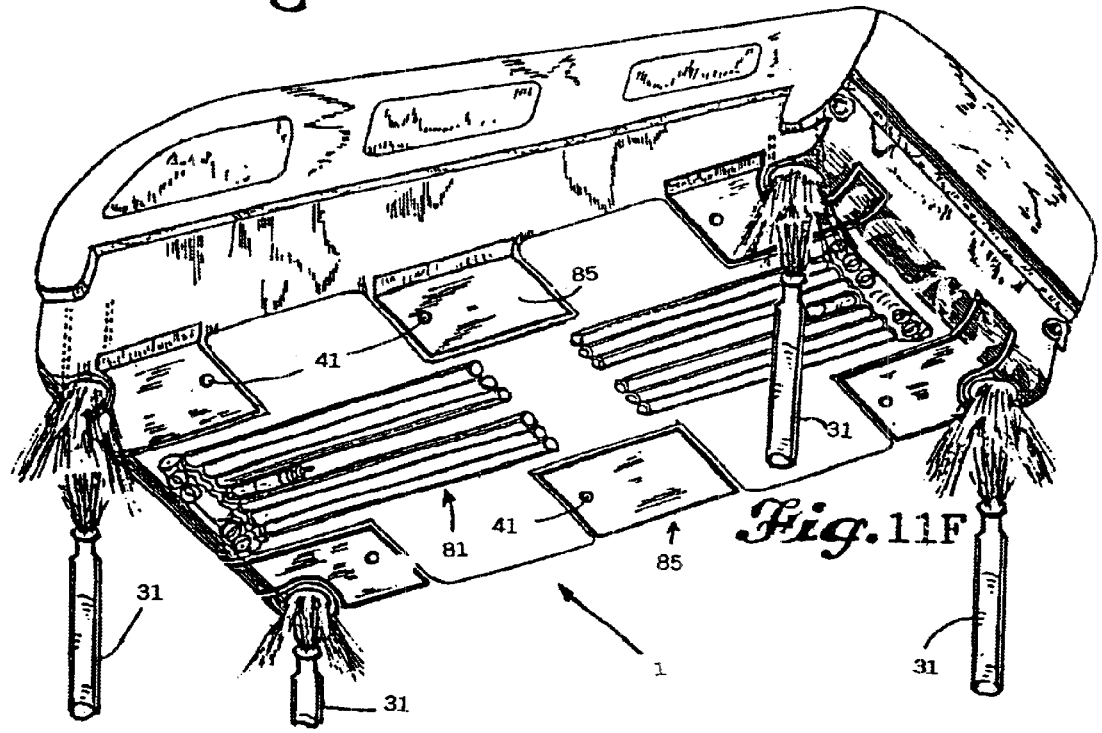
FIG. 11F illustrates a bottom planar view of the escape cabin shown in FIG. 11E during its eventual stage of detachment from the telescopically cooperating pair of pipes at the end of the first stage in the ejection process.

In FIG. 11E the escape cabin 1 is more analytically illustrated in a bottom planar view during the first stage of detachment and at the instant of its vertical ejection by means of launching of the catapults 80, whereas in FIG. 11F the escape cabin of FIG. 11E is shown during its final stage of detachment from the supporting strut arrangement of the telescopically operating pipes 31 and at the end of the first stage of its ejection occurring by means of the catapults 80, whilst at the same time the second stage of the cabin's detachment from the fuselage 4 is initiated, which is accomplished by means of the arrangement of rocket motors 81, so that rapid ejection of the escape cabin 1 from the fuselage 4 can be achieved and the crashing of the same onto the vertical stabilizer 4a of the aircraft may be avoided.

Figure 11G:
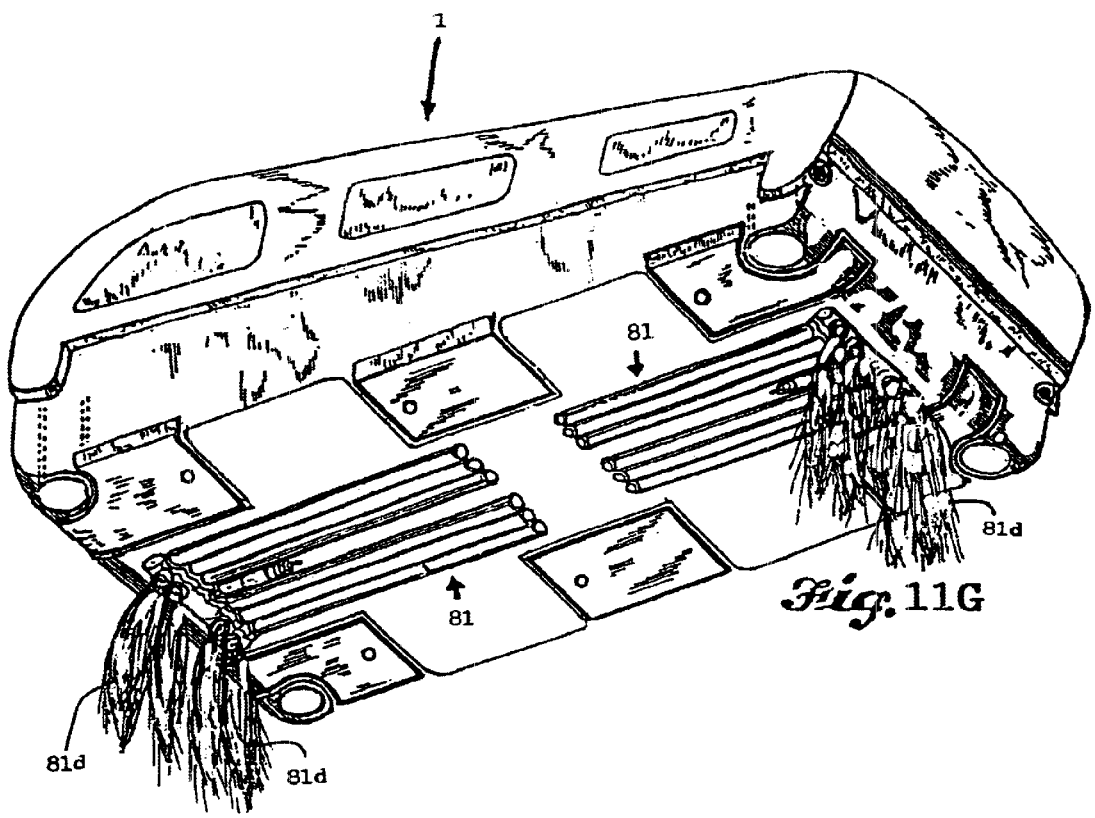
FIG. 11G illustrates a bottom planar view of the escape cabin during the second stage in the ejection process thereof with its rocket motors in full operation.
Figure 11H:
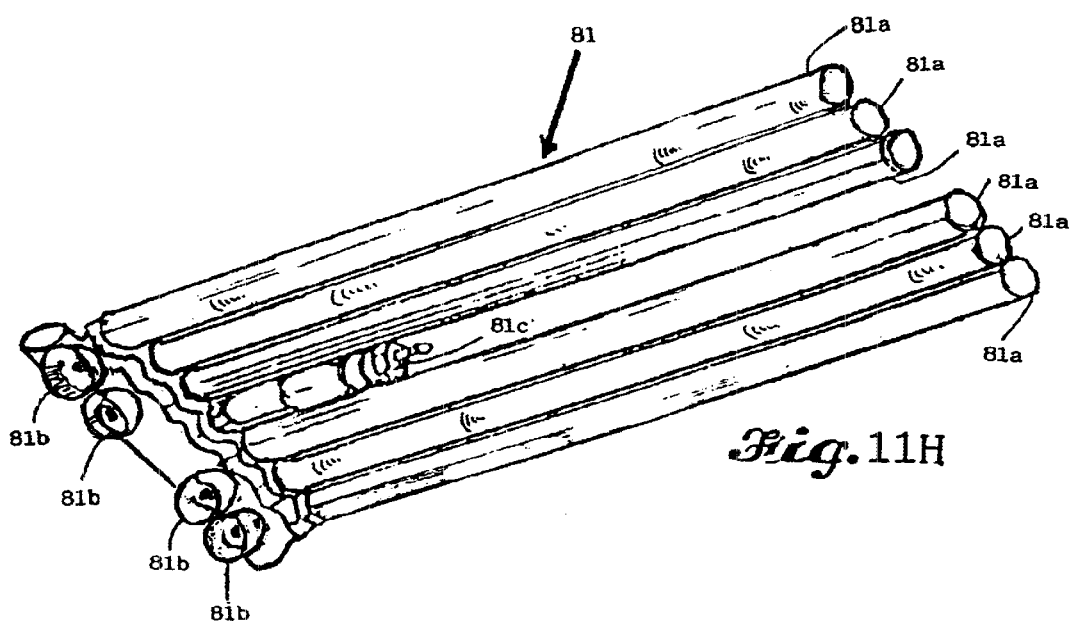
FIG. 11H illustrates in perspective view the arrangement of rocket motors and the components thereof.

In FIG. 11H the rocket motor 81 is illustrated, consisting of a plurality of cartridge units 81 a, a corresponding plurality of nozzles 81b, the ignition unit 81c, which is shown in detail in FIG. 3 where it is mounted on the external side of the floor of the escape cabin 1 in indicatively illustrated preferred arrangement of points thereof.

In FIG. 11G the escape cabin 1 is illustrated in a bottom planar view during the second stage of its rapid ejection process from the aircraft 4 where its rocket motors are shown in full operation.

In FIGS. 3A–3C is depicted the application of the invention with respect to the cabin's rapid ejection process, where the aircraft 5 is illustrated with its passenger escape cabin 1 detachable from the fuselage 4, during the instants at which the cabin's rapid ejection occurs through the activation of the systems allocated in effecting rapid ejection process, such as the catapults 80 and the rocket motors 81. In the same Figures the launching of the parachutes 13, 14 is shown to have been accomplished by means of the rocket 35, as well as the full deployment of the parachute 14 that provides the cabin's secure descending to Earth. More analytically, in FIG. 3A is shown in perspective view the detachment of the escape cabin 1 from the fuselage 4 of the aircraft 5 being accomplished by means of igniting the launching catapults 80 and during the instant at which the pilot has pulled the special operating lever 10 in the cockpit 11, as well as the small rocket 35 that drags along from their storage location the parachutes 13, 14 during the first stage.

In continuation of the above, in FIG. 3B, approximately 0.40 sec from the pulling of the operating lever 10, the escape cabin 1 is shown in perspective view to be moving away in a vertical upward direction with the aid now of the rocket motors 81 so that it may not crash on the vertical stabilizer wing 4a of the fuselage 4, whilst deployment of parachutes 13, 14 is also shown to be in progress. In the final stage (FIG. 3C) of the rapid ejection process of the cabin 1, approximately 2.90 sec from the pulling of the operating lever 10, the escape cabin 1 is shown in perspective view to be sustained by the main parachute 14 and, since it is now released from the fuselage 4, it starts to descend slowly to Earth.

With regard to another field of application of the present invention, an arrangement of airbag is proposed as being an integral component of the external side of the floor of the escape cabin 1.

The airbags that will be inflated in fractions of a second prior to the arrival of the escape cabin 1 to the Earth, will function as the barrier between the rough or sharp surface of the ground and the escape cabin 1 by absorbing its kinetic energy. The airbags are placed in the external part of the escape cabin's floor and they are designed in such a way as to protect the passengers within the escape cabin 1 during its impact onto the Earth. During such a crash, a load exceeding a predefined limit is exerted along the passengers' spinal column and this may cause an irreparable damage to them. Without the external airbags the passengers' bodies may slip out of their seats and become injured. During the first milliseconds of the airbags' unfolding, the escape cabin approaches the ground and it will be at a distance from the ground such that there will be sufficient space in order that the airbags can be filly inflated.

The airbag boxes being properly mounted at suitable points of the exterior bottom surface of the escape cabin 1 constitute effective means for the passive safety of its passengers.

In order that the airbags are activated at a predefined distance from the ground, and before the crash occurs, a distance detection sensor 41 with infrared radiation 41*a* is installed in the airbag box 85 (FIG. 4), which calculates the distance from the ground at which the infrared beam is discontinued and, according to this data, an estimation is carried out as to whether the ground is close enough to the airbag box and how close is this to the ground.

More analytically, in FIG. 3 the escape cabin 1 of the invention is shown in a bottom planar view with details illustrating its equipment, that is the airbag boxes 85 as well as their socket openings 37 at the bottom of the escape cabin 1. In FIG. 3 some of the socket openings 37 are shown prior to mounting upon them of the airbag boxes 85, whereas the remaining openings are shown already carrying the airbag boxes 85. Some of the socket openings 37 are shown differentiated as regards their shape due to the catapult 80 being boxed close to them. Therefore, the airbag boxes 85 to be housed within such differentiated socket openings located at the corners of the escape cabin 1 will be of correspondingly differentiated configuration.

Figure 4:
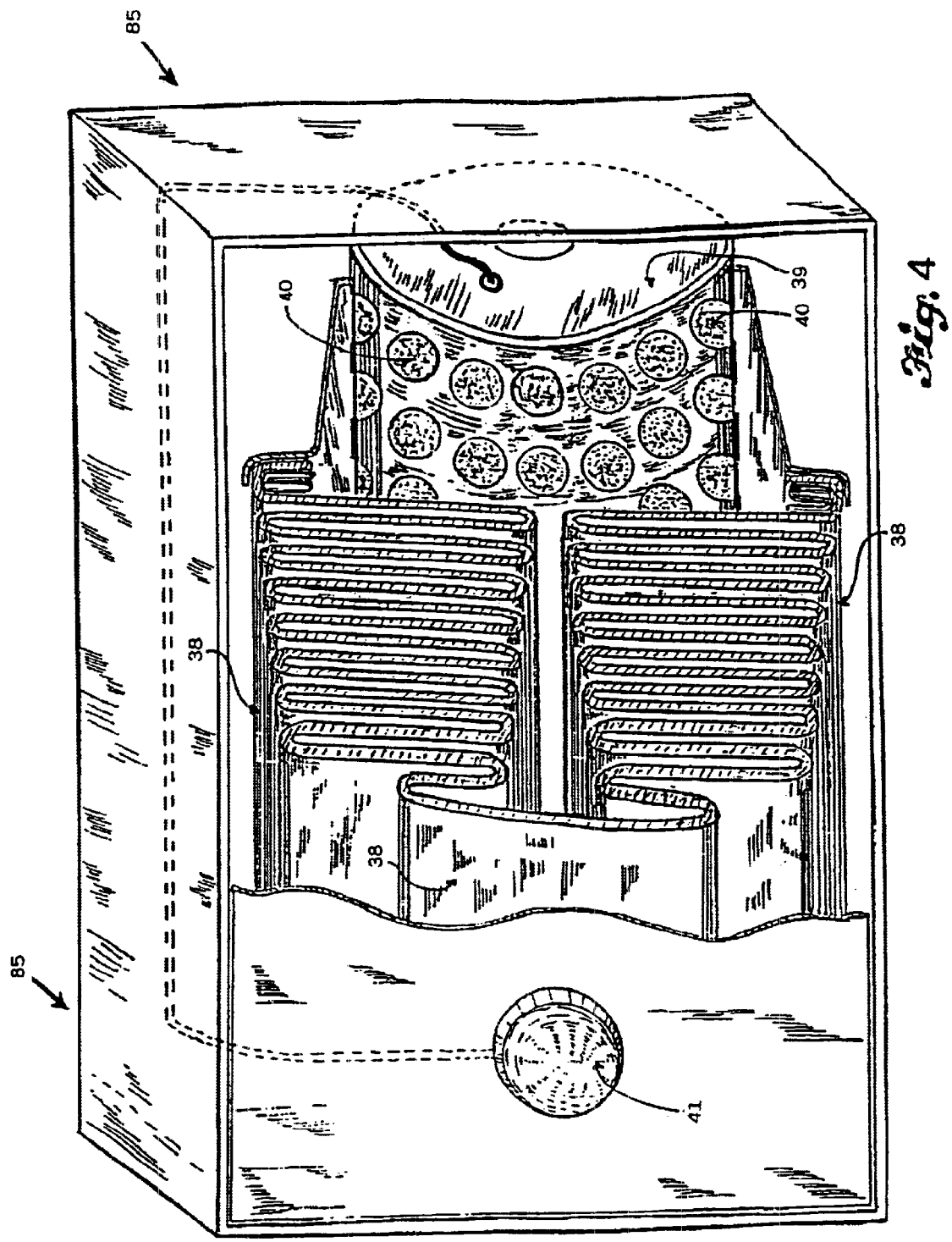
FIG. 4 illustrates in perspective view the airbag's box, within which there are provided elements of the airbag equipment, which are illustrated in sectional view.

In FIG. 4 the airbag box 85 is shown constituting an independent construction that is furnished with the full equipment that accompanies the airbag 38, and which may be available also as an independent product in the market so that it can be adapted to aircraft carrier means in general, i.e. to the conventional aircrafts with parachute equipment already in use, which however lack the safety elements such as the airbag boxes 85.

In FIG. 4 the airbag 38 is illustrated properly folded and in sectional view, packed within its box 85. The boiler mechanism 39 is installed at the basement of the airbag, containing a suitable chemical solid fuel preparation 40, such as propergol or any other suitable solid fuel, as known and in use today, or which might become available in the future. The mechanism of the boiler 39 is thoroughly and hermetically enclosed by the airbag 38. In the case of an imminent impact of the escape cabin 1 onto the ground, the electronic distance detection sensor 41 activates an electric contact that lies at the center of the mechanism of the boiler 39 thereby inducing the ignition of propergol, combustion of which is carried out within 35 milliseconds, resulting in the emission of gas that rapidly inflates the airbag 38 shortly before its contact with Earth so that it can absorb the impact energy being produced. In the case of impact, the airbag is inflated and it will remain as such for approximately 150–200 milliseconds, an interval that is sufficient to prevent the injury of the passengers that are seated inside the escape cabin 1 or of the passengers of another conventional aircraft 70 of conventional aircrafts being equipped with the airbags of the invention.

The airbag 38 of the invention is manufactured of special fabric, which exhibits waterproof properties and is free of pores so that it can retain the air within it, whereas in addition it should have sufficient thickness in order to withstand the forces that develop during the crash. This fabric can be also manufactured from any other suitable material, which is presently available in the market or may become available in the future.

Figure 4A:
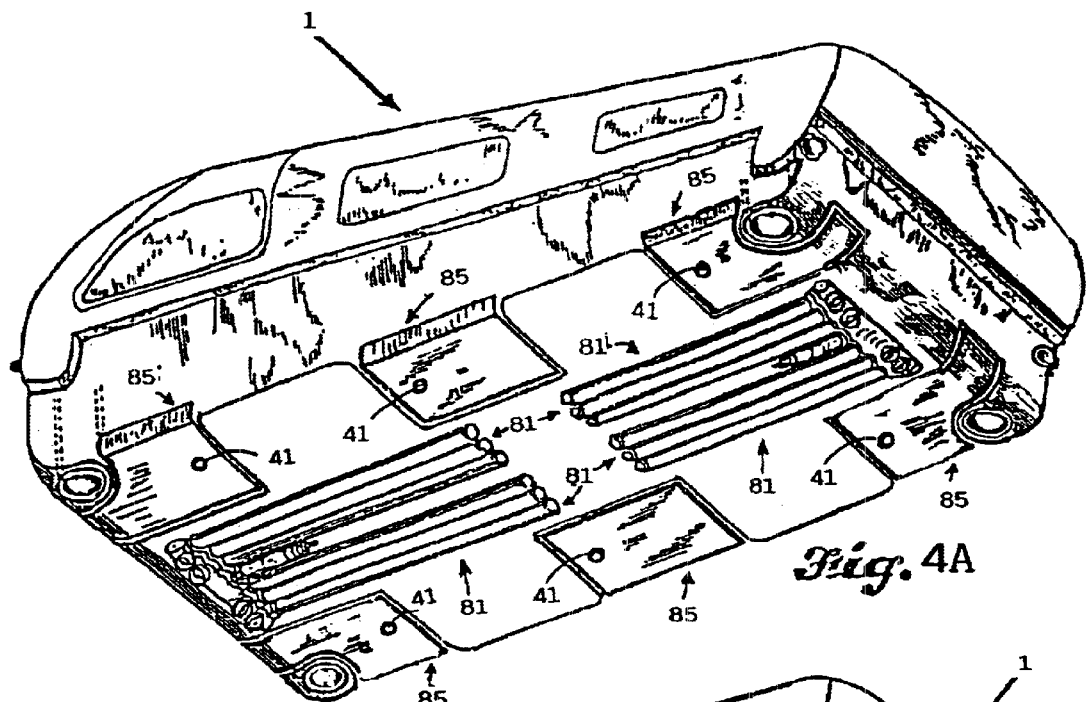
FIG. 4A illustrates a bottom planar view of the escape cabin of the invention with the equipment of the airbags housed in their sockets before the airbags are activated, as well as the rest of the fast ejection equipment.

In FIG. 4A the escape cabin 1 is illustrated in a bottom planar sectional view with all its equipment such as the airbag boxes 85 placed at their corresponding socket openings 37 and before their activation through the distance detection sensors 41.

Figure 4B:
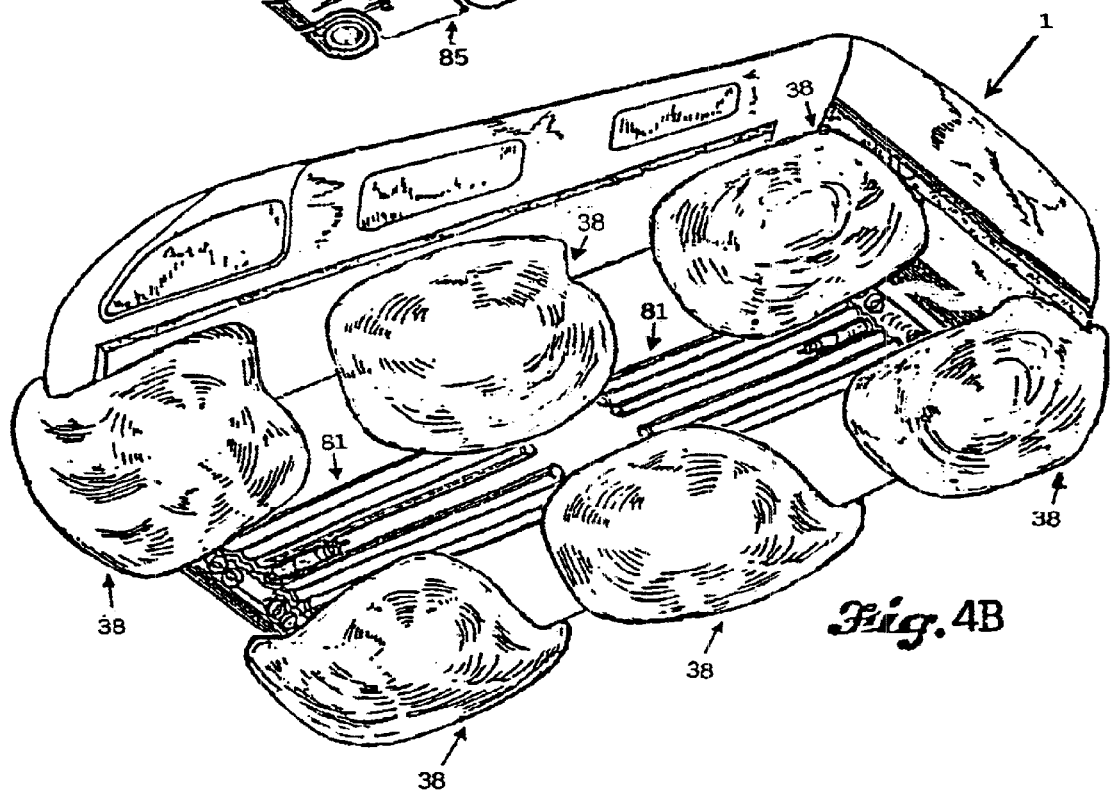
FIG. 4B illustrates a bottom planar view of the escape cabin of FIG. 4A with the airbags equipment being fully deployed and the airbags being fully inflated and ready to absorb the impact energy.

In FIG. 4B the escape cabin shown in FIG. 4A is illustrated in a bottom planar view with all the airbag boxes 85 activated and its airbags 38 fully unfolded—i.e. inflated—being prepared to absorb the impact energy produced during their collision on the Earth at the precise moment when they are fully unfolded.

According to one additional alternative preferred embodiment of the invention, as illustrated in FIG. 5, the wide body light jet 79 is proposed to operate with the detachable from the wide body aircraft 4 (FIG. 6C) passenger escape cabin 1 (FIG. 6B). In this case the detachment may be executed in either the mode of smooth detachment of the cabin 1 or the mode of the rapid ejection thereof.

Herein below, we will describe, with reference to the accompanying drawings, an illustrative embodiment of the smooth detachment process of the cabin 1.

The aircraft 79, as illustrated in the planar view of FIG. 5 has due to its engine failure stalled and this has resulted in its diving towards the Earth.

In the side view of FIG. 6A, the diving of the aircraft 79 has increased, and as a result the aircraft's pilot has activated the ballistic parachute system 13, 14, through the launching of the small rocket 35, which results in the deployment of the small parachute 13 that has been dragged by the small launching rocket 35.

In FIG. 6B, the main parachute 14 has been fully deployed and, as a consequence, the aircraft 79 has leveled off and the connection members 2 and 6 of the speedily released set of connectors have automatically disconnected the escape cabin 1, as shown in FIG. 6B, from the fuselage 4 that is illustrated in FIG. 6C. Hence, the fuselage 4 begins its rapid fall to Earth whereas the escape cabin 1 being sustained by the parachute 14, is slowly and safely descending to the Earth provided that the airbag boxes 85 are placed underneath its external floor in order to absorb the impact energy produced by the cabin's collision onto the ground.

The 20-seat wide body light jet 79 of the example represents also other aircrafts with larger passenger transport ability.

Aiming at the lightest possible weight for the escape cabin 1, it should be constructed by composite materials or alloys such as those of aluminum—lithium, as well as from plastic, or even from other known materials already in use today or other materials that may become available in the future.

In addition, there will be provision to include the necessary safety elements for the passengers' survival in case of an escape that occurs at a very high height, so that the compressed air therein may be retained for a while in order to prevent decompression during the escape cabin's detachment, whereas the passengers may undergo the so called 'hypoxia' state being attributed to the lack of oxygen and therefore being given at least the sufficient time to wear their masks.

Furthermore, the length of the escape cabin 1 will be as large as to include all passenger and crew seats, whereas it should be properly designed so that in case of a splashdown it should be capable of floating even when in rough seas in order to provide the necessary safety for its passengers.

The escape cabin 1 shown in FIGS. 1A, 1D, 3, 3A–C, 6B in accordance to the embodiment of the invention related to an aircraft with a detachable passenger escape cabin can be applied both in smaller, light aircrafts 5 as well as in larger ones. Furthermore the invention is also applicable even in the much larger Jumbo Jets, provided however that the proper design—modifications of the escape cabin 1 and the fuselage 4 will be carried out.

It should herein be noted that the description of the invention was accomplished with reference to illustrative embodiments of non-limiting character. Thus, any amendment or modification with respect to the illustrated figures, magnitudes, arrangements, materials, construction and assembly components, techniques applied regarding the construction and operation of the escape cabin 1, the parachutes 13, 14, the catapults 80, the rocket motors 81, the airbag boxes 85 applicable in the aircraft with detachable escape cabin or in conventional aircrafts of any type, provided that they do not comprise a new inventive step and do not contribute to the technical development of the already known are considered as being included in the aims and scope of the present invention, as these are being specified in the following Claims.

What is claimed is:

1. An aircraft with a detachable passenger escape cabin (1), said passenger escape cabin (1) extending longitudinally along the fuselage (4) of said aircraft (5) including the cockpit (11) and excluding the tail portion (4a) thereof and mounted upon an opening (3) of said fuselage (4), said passenger escape cabin being compact and detachable in a vertical upward direction when emergency conditions arise, either through smooth detachment after leveling off of said aircraft or through rapid ejection under extremely adverse conditions, wherein the configuration of said opening (3) of said fuselage (4) is such as to be brought in matching contact with said cabin (1) having a corresponding configuration when a circumferential projection (1a) of said cabin (1) sits upon a correspondingly shaped circumferential supporting basement (3a) around the perimeter of said opening (3) of the fuselage (4), a speedily released set of connectors being employed in securely connecting said cabin (1) onto said opening (3) of fuselage (4), said speedily released set of connectors comprising a plurality of connection members (2) fixedly mounted at a circumferential arrangement of points of said cabin (1) below said circumferential projection (1a) thereof and a corresponding plurality of connection members (6) fixedly mounted at a circumferential arrangement of points of said fuselage (4) located so as to come into matching contact with said connection members (2) of said cabin (1), wherein a longitudinally extending chamber (29) is being formed in between each one of the pairs of connection members (2,6), a piston (25) bearing spring catch means (25a) being provided within said chamber (29), wherein said piston (25) and associated spring catch means (25a) is pressed into a locked condition of said connection members (2,6) by means of a compression spring (25b) and wherein, via manipulation of an operating lever (10) located within said cockpit (11), a mechanism is activated which results in said piston (25) moving linearly within said chamber (29) in the direction of compression of said compression spring (25b) and eventually resulting into release of said spring catch means (25a) and subsequent disengagement of said connection members (2,6), which corresponds to an unlocked condition of said connection members (2,6), said cabin (1) further comprising:
   an arrangement of parachutes (13, 14) and means of deployment thereof;
   an arrangement of airbags (38), and
   an arrangement of launching catapults (80) and rocket motors (81) for enhanced speed of vertical upward movement of said detachable passenger escape cabin (1).

2. An aircraft with a detachable passenger escape cabin, according to the above claim 1, wherein said mechanism being activated so as to effect linear movement of said piston (25) within said chamber (29) resulting into disengagement and unlocked condition of said connection members (2,6) is a pyrotechnic mechanism comprising explosive material (28) being located in a cavity at the end of said chamber (29) whereupon sits said piston (25) when said connection members (2,6) are brought into a locked condition and a detonator device (27) by means of which explosion of said explosive material (28) is initiated so as to effect linear movement of said piston (25), release of said associated spring catch means (25a) and subsequent disengagement and bringing of said connection members (2,6) into an unlocked condition.

3. An aircraft with a detachable passenger escape cabin, according to the above claim 1, wherein said mechanism being activated so as to effect linear movement of said piston (25) within said chamber (29) resulting into disengagement and unlocked condition of said connection members (2,6) is a hydraulic mechanism comprising a pipe (23) carrying a special fluid (22) into a cavity at the end of said chamber (29) whereupon sits said piston (25) when said connection members (2,6) are brought into a locked condition, wherein said hydraulic mechanism is activated when pressure of said special fluid (22) is increased so as to effect linear movement of said piston (25), release of said associated spring catch means (25a) and subsequent disengagement and bringing of said connection members (2,6) into an unlocked condition.

4. An aircraft with a detachable passenger escape cabin, according to the above claim 1, wherein said mechanism being activated so as to effect linear movement of said piston (25) within said chamber (29) resulting into disengagement and unlocked condition of said connection members (2,6) is a pneumatic mechanism comprising a pipe (23a) carrying compressed air (22a) into a cavity at the end of said chamber (29) whereupon sits said piston (25) when said connection members (2,6) are brought into a locked condition, wherein said mechanism is activated when, via manipulation of said operating level (10) located within said cockpit (11), pressure of said compressed air (22a) is increased so as to effect linear movement of said piston (25), release of said associated spring catch means (25a) and subsequent disengagement and bringing of said connection members (2,6) into an unlocked condition.

5. An aircraft with a detachable passenger escape cabin, according to the above claim 1, wherein said mechanism being activated so as to effect linear movement of said piston

(25) within said chamber (29) resulting into disengagement and unlocked condition of said connection members (2,6) is a mechanically activated mechanism comprising a wire rope (18) being connected to said piston (25), wherein said mechanism is activated when, via manipulation of said operating level (10) located within said cockpit (11), a linear traction is exerted upon piston (25) so as to effect linear movement thereof, release of said associated spring catch means (25a) and subsequent disengagement and bringing of said connection members (2,6) into an unlocked condition.

6. An aircraft with a detachable passenger escape cabin, according to the above claim 1, wherein said arrangement of parachutes (13, 14) and means of deployment thereof comprises a smaller parachute (13), a larger parachute (14), a small launching rocket (35) for said parachutes (13, 14) and an arrangement of cables (36a, 36b, 36c), said cables (36a, 36b, 36c) being mounted within grooves (34a) at the top (34) of said escape cabin (1) and when deployed extend upwards from points (33a, 33b, 33c) located at said top (34) of said escape cabin (1), said parachutes (13, 14) and small launching rocket (35) being stored within hole (32) located rearwards of said top (34) of said escape cabin (1), wherein deployment of said parachutes (13, 14) under emergency conditions is effected by first launching of said small launching rocket (35) which leads to deployment of said smaller parachute (13) and subsequent deployment of said larger parachute (14) which leads said passenger escape cabin (1) to a controlled descending down to earth.

7. An aircraft with a detachable passenger escape cabin, according to the above claim 1, wherein said arrangement of launching catapults (80) and rocket motors (81) for enhanced speed of vertical upward movement of said detachable passenger escape cabin (1) comprises:

an arrangement of four launching catapults (81) located at corresponding four corners (1c) and being stored within corresponding vertically extending openings (1d) at the bottom of said escape cabin (1), each one of said launching catapults (80) comprising a pair of pipes (30, 31), said pipe (31) having a smaller diameter than said pipe (30) and being telescopically inserted in the interior thereof, said pipe (30) having an upper closed end (30a) and a lower open end (30b) via which said pipe (31) is inserted, said pipe (31) having a lower closed end (31a) and an upper open end (31b) via which it is inserted into said pipe (30), said pipe (31) being filled with a predetermined quantity of explosive material, wherein during a first stage of launching operation of said passenger escape cabin (1) said explosive material is ignited and said pipes (31) are telescopically exerted from corresponding said pipes (30) thereby forming an arrangement of four supporting struts for said passenger escape cabin (1) onto said fuselage (4), and an arrangement of rocket motors (81) located at the exterior surface of the bottom of said escape cabin (1) and comprising a plurality of cartridge units (81a), a corresponding plurality of nozzles (81b) and an ignition unit (81c), wherein during a second stage of launching operation of said passenger escape cabin (1), after completion of said first stage, said rocket motors (81) are used to attain an enhanced speed of vertical upward movement of said detachable passenger escape cabin (1).

8. An aircraft with a detachable passenger escape cabin, according to the above claim 1, wherein said arrangement of airbags (38) comprises a plurality of airbags (38), each airbag (38) being stored within a storage box (85), said airbag storage boxes (85) being arranged at corresponding socket openings (37) at the bottom of said passenger escape cabin (1), each one of said airbag storage boxes (85) containing said airbag (38) at a folded and packed condition together with a boiler mechanism (39) with solid fuel (40), said airbag storage box (85) also comprising a distance detection sensor (41), wherein when said passenger escape cabin (1) descending to earth at a speed being controlled by said parachutes (13, 14) arrives at a predetermined distance from the ground, each one of said distance detection sensors (41) activates an electrical contact at each one of said boiler mechanisms (39) and initiates ignition of said solid fuel (40) which is rapidly combusted and thereby generates gas rapidly inflating said airbags (38) which extend beyond the bottom of said escape cabin (1) and are thereby adapted to absorb loads developing upon impact of said passenger escape cabin (1) onto the ground.

\* \* \* \* \*